United States Patent [19]

Hayashi

[11] Patent Number: 5,918,238

[45] Date of Patent: Jun. 29, 1999

[54] DOCUMENT PROCESSING APPARATUS WHICH EVALUATES ELEMENTS OF A DOCUMENT AND CHANGES THE COLOR/FORMAT OF ELEMENTS THAT SATISFY USER-DEFINED PARAMETERS

[75] Inventor: Naoki Hayashi, Nakai-machi, Japan

[73] Assignee: Fuji Xerox Co., Ltd., Tokyo, Japan

[21] Appl. No.: 08/630,485

[22] Filed: Apr. 10, 1996

[30] Foreign Application Priority Data

Apr. 13, 1995 [JP] Japan ..................................... 7-111043

[51] Int. Cl.[6] .................................................. G06F 17/24
[52] U.S. Cl. .......................... 707/526; 707/529; 707/509; 345/440
[58] Field of Search ..................................... 395/790, 131, 395/140; 707/526–529, 504, 522, 509; 345/431, 440

[56] References Cited

U.S. PATENT DOCUMENTS

| 5,140,440 | 8/1992 | Sasaki ..................................... 358/453 |
| 5,155,538 | 10/1992 | Monfalcone ............................. 355/313 |
| 5,363,211 | 11/1994 | Hasebe et al. ........................... 358/451 |
| 5,493,424 | 2/1996 | Tomita et al. ........................... 358/500 |
| 5,499,180 | 3/1996 | Ammirato et al. .................... 364/419.1 |
| 5,566,289 | 10/1996 | Ikeo et al. ............................... 707/517 |

FOREIGN PATENT DOCUMENTS 6-215099  8/1994  Japan .
7-220101  8/1995  Japan .

*Primary Examiner*—Joseph H. Feild
*Attorney, Agent, or Firm*—Oliff & Berridge, PLC

[57] ABSTRACT

The present invention provides a document processing apparatus including an information inputting component for inputting document information having a document element including a numeric value, an element detecting component for detecting the document element including the numeric value in the document information input by the information inputting component, an element value detecting component for detecting the numeric value included in the document element detected by the element detecting component, and a storing component for storing a numeric value condition and a method of emphasis of a document element corresponding to the numeric value condition. Emphasis determining components determine the method of emphasis of the document element detected by the element detecting component, if the numeric value detected by the element value detecting component satisfies the numeric value condition stored in the storing component, by fetching a method of emphasis of the document element corresponding to the satisfied numeric value condition. Image information generating components generate a document image in which emphasis is given to the document element detected by the element detecting component according to the method of emphasis determined by the emphasis determining components.

22 Claims, 21 Drawing Sheets

FIG. 2

| CONDITION SYMBOL | CONDITION VALUE | CHARACTER COLOR | IDxF | CELL AREA COLOR | IDxB |
|---|---|---|---|---|---|
| < | 200 | \red255\green0\blue0; | 1 | \red255\green255\blue255; | 3 |
| = | 1000;2000 | \red127\green127\blue0; | 4 | \red0\green0\blue255; | 2 |
| ≥≤ | 500;800 | \red255\green0\blue0; | 0 | \red255\green0\blue0; | 1 |
| ⋮ | ⋮ | ⋮ | ⋮ | ⋮ | ⋮ |

FIG. 6(a)
BEFORE CONVERSION

|         | 1991 | 1992 | 1993 | 1994 |
|---------|------|------|------|------|
| TOKYO   | 1000 | 1600 | 2000 | 2300 |
| OSAKA   | 800  | 500  | 950  | 900  |
| NAGOYA  | 300  | 500  | 700  | 300  |
| SAPPORO | 50   | 150  | 250  | 300  |

FIG. 6(b)
AFTER CONVERSION

PALE YELLOW (CHARACTER COLOR)
BLUE (CELL AREA COLOR)

|         | 1991 | 1992 | 1993 | 1994 |
|---------|------|------|------|------|
| TOKYO   | 1000 | 1600 | 2000 | 2300 |
| OSAKA   | 800  | 850  | 950  | 900  |
| NAGOYA  | 300  | 500  | 700  | 850  |
| SAPPORO | 50   | 150  | 250  | 300  |

RED (CHARACTER COLOR)
RED (CELL AREA COLOR)

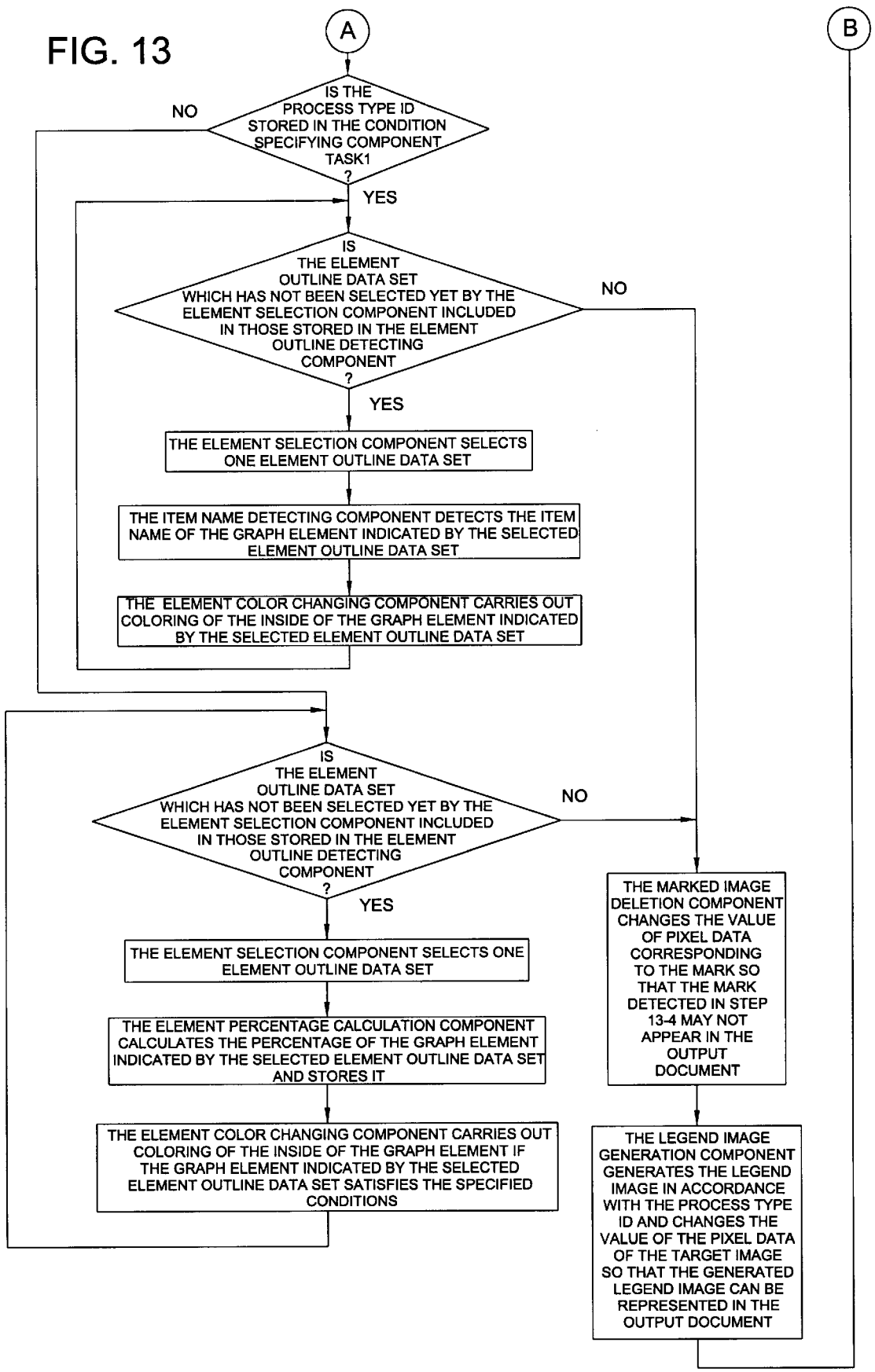

DOCUMENT PROCESSING APPARATUS WHICH EVALUATES ELEMENTS OF A DOCUMENT AND CHANGES THE COLOR/FORMAT OF ELEMENTS THAT SATISFY USER-DEFINED PARAMETERS

BACKGROUND OF THE INVENTION

1. Field of the Invention

The present invention relates to a document processing apparatus and a method using thereof which process multi-color image information, for example, a wordprocessor capable of making a color document, a color copying machine or a color printer.

2. Discussion of the Related Art

By the use of a computer system including a color scanner, a color printer or a color copying machine, circumstances under which an end user can make a color document need to be simplified. There is the converting a monochrome document previously made or a document sent by a facsimile into a color document, and in particular, there is a great demand for color conversion of tables or graphs since they will be more understandable by coloring.

With respect to the tables or graphs already colored, there are also the cases where color arrangements should be changed if they serve a different purpose from what it was when they were made. For example, if a point of emphasis is changed, the color arrangements of tables or graphs are required to be changed in accordance with the change of the point of emphasis. In such case, there is the need for the change of colors with ease according to the purpose.

To satisfy the above-described needs, an invention has been disclosed in the Japanese Patent Application Unexamined Publication No. Hei. 6-215099 (1994), which colors a table on every alternate lines or every alternate rows, or colors a particular line or row for the purpose of emphasizing. If this idea is applied to graphs, appropriate color arrangements can be provided for a graphic element of a bar graph or a pie graph for making it easily understandable. Here, the "graphic element" refers to every visual element representing a value shown by the graph, namely, a bar in the bar graph, a sector in the pie graph, a segment in the line graph, a rectangle in the stacked bar graph, a ball in the ball graph, a box in the box graph (used for representation of a stock price fluctuation), or the like.

However, the conventional art described above is intended to color the table or graph in accordance with layout information, and therefore it cannot perform coloring based on meanings indicated by the table or graph.

For example, it is assumed that a user desires to color the at least one cell having a particular value for easy distinction, but the invention disclosed in the Japanese Patent Application Unexamined Publication No. Hei. 6-215099 (1994) changes the color of the table per every alternate line or every alternate rows and cannot comply with such request.

In the case of the graph, for example, a bar graph showing sales, requests for changing a color of at least one bar representing a specific value or more to emphasize such a bar are frequently advanced. In another example, if the fluctuation of shares of every company in a specific field is to be represented by plural pie graphs, sectors indicating shares of the respective companies are generally arranged in order of sharing rank in a clockwise direction, where it is desired that a particular color is used for each company in all pie graphs. However, no conventional art seems to comply with the above requests.

SUMMARY OF THE INVENTION

The present invention has been made in view of the above circumstances and has as an object of providing a document processing apparatus and a method using thereof which automatically give emphasis to elements of a table or a graph according to meaning indicated by the table or graph in coloring the table of graph in a monochrome document or in changing color arrangements of the table or graph which has been already colored.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a document processing apparatus of the present invention comprises information inputting means for inputting document information comprising a document element including a numeric value, element detecting means for detecting the document element including the numeric value in the document information input by the information inputting means, element value detecting means for detecting the numeric value included in the document element detected by the element detecting means, storing means for storing a numeric value condition and a method of emphasis of a document element corresponding to the numeric value condition, emphasis determining means for determining the method of emphasis of the document element detected by the element detecting means, if the numeric value detected by the element value detecting means satisfies the numeric value condition stored in the storing means, by fetching a method of emphasis of the document element corresponding to the satisfied numeric value condition, and image information generating means for generating a document image in which emphasis is given to the document element detected by the element detecting means according to the method of emphasis determined by the emphasis determining means. A document processing method according to the present invention using a document processing apparatus having document inputting means for inputting a document, display means for displaying the document and storing means for storing a numeric value condition and a method of emphasis of a document element corresponding to the numeric value condition, which comprises the steps of (a) inputting document information comprising a document element including a numeric value, (b) detecting the document element including the numeric value in the document information input in step (a), (c) detecting the numeric value included in the document element detected in step (b), (d) determining the method of emphasis of the document element detected in step (b), if the numeric value detected in step (c) satisfies the numeric value condition stored in the storing means, by fetching a method of emphasis of the document element corresponding to the satisfied numeric value condition, and (e) generating a document image in which emphasis is given to the document element detected in step (b) according to the method of emphasis determined in step (d).

BRIEF DESCRIPTION OF THE DRAWINGS

The accompanying drawings, which are incorporated in and constitute a part of this specification illustrate embodiments of the invention and, together with the description serve to explain the objects, advantages and principles of the invention. In the drawings:

FIG. 2 shows an example of a cell value-color correspondence table;

FIGS. 6(a) and 6(b) illustrate coloring of cells;

FIGS. 12–13 show a flow of overall processing of the second embodiment carried out by a process control component;

DETAILED DESCRIPTION OF THE PREFERRED EMBODIMENTS

Figure 1:
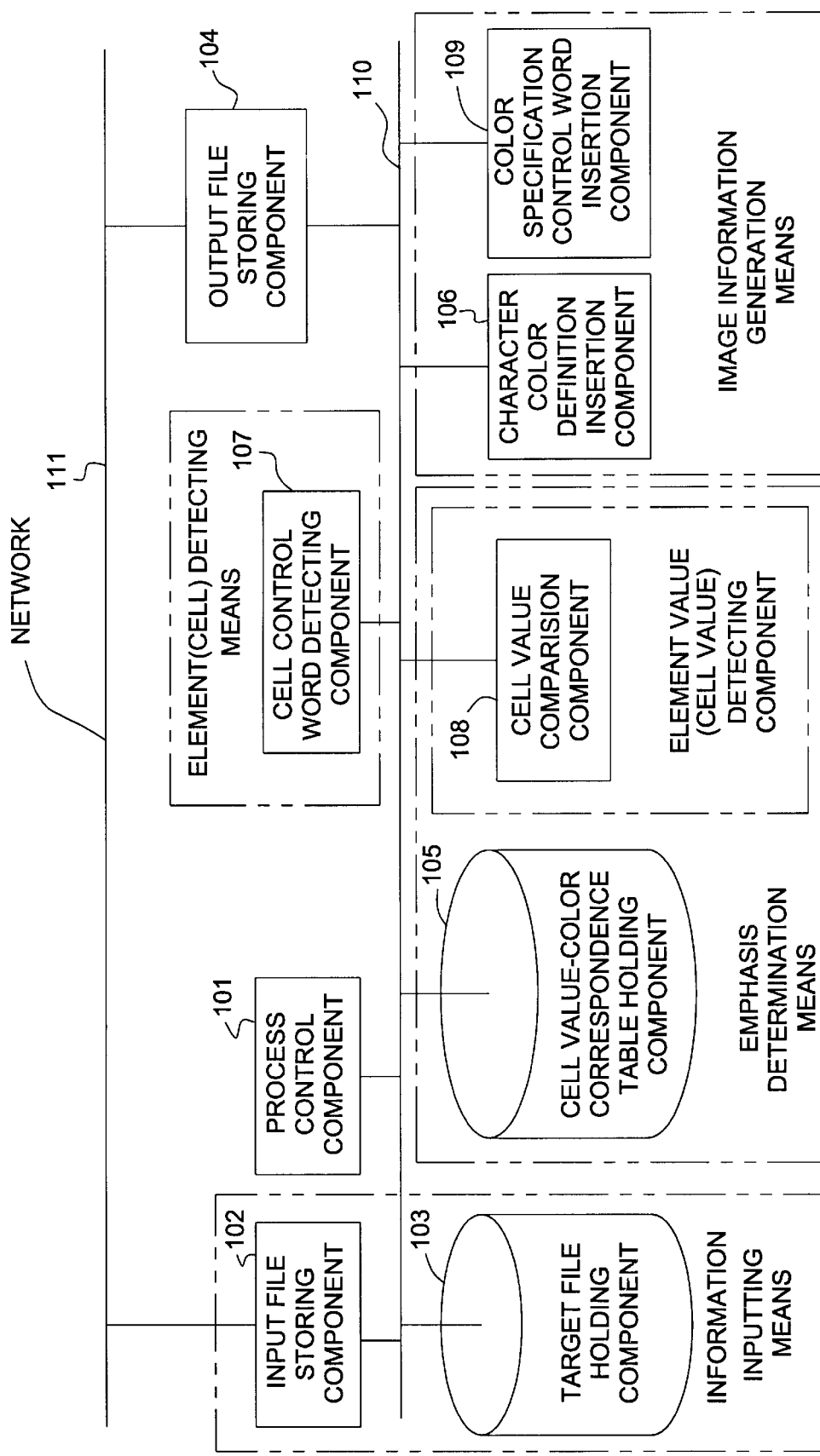
FIG. 1 shows a construction of a first embodiment of a document processing apparatus according to the present invention.

Preferred embodiments of a document processing apparatus according to the present invention are now described in detail based on the drawings.

FIRST EMBODIMENT

An Electronic Document File Converter

A first embodiment reads an electronic document file including layout information, detects at least one cell in a table, changes layout of the cell which satisfies a certain condition and then outputs the electronic document file in which the layout of the cell is changed. In this embodiment, the condition is that a value of the cell is a specific value. As the change of the layout, coloring of characters representing the cell value and an area inside the cell is executed.

In this embodiment, a file format for input and output conforms to the Rich Text Format (hereinafter referred to as RTF) and an input file is fixed in monochrome setting. Here, color representation and table expression in the RTF Specification are described.

The RTF file comprises a header and a document. In the header, a declaration of colors, fonts and layout styles used in this file is described. In the document, how to layout strings is described using control words defined in conformance with the RTF Specification and the declaration in the header, as well as the contents of the text are described.

The color used in the file is specified by the declaration in a color table group in the header. The declaration is expressed by the following grammar based on the Backus Normal Form (hereinafter referred to as BNF):

<colortbl> '{\'colortbl<colordef>+'}'
<colordef> \red? & \green? & \blue?';'

Here, the word beginning with a backslash is the control word defined in conformance with the RTF Specification. \colortbl indicates the declaration in the color table. \red, \green and \blue indicate RGB, respectively and the integral number value following the control word indicates the degree of each color. The value of the integral number ranges from 0 to 255.

For example, in the description
{\colortbl\red0\green0\blue0;\red255\green0\blue0;\red0\green0\blue255;\red255\green255\blue255;\red127\green127\blue0;},
it is declared that the five colors, black (\red0\green0\blue0;), red (\red255\green0\blue0;), blue (\red0\green0\blue255;), white (\red255\green255\blue255;), and yellow (\red127\green127\blue0;) are used in the file.

For specifying a color for characters from among the colors declared in the color table, \cf, one of the control words which change character format properties is used. An integral number value of 0 or more following \cf is an index specifying what color in the color table is used. If the index value is N, a color having the order of N+1 in the color table is specified.

The color specification is applied to strings following these control words and is effective until other color specification (including control words such as \pard or \secd meaning "returns to a default value") is provided.

For instance, in a file including the header in the above-described example of declaration in the color table, if there are descriptions such as {\cf1 The color of this sentence is red.} and {\cf0 The color of this sentence is black.}, the string "The color of this sentence is red" is colored red and the string "The color of this sentence is black" is colored black.

Next, the table expression is described. With the RTF Specification, a table is expressed in a form of succession of rows. Description of a certain row begins with a control word \trowd and ends in \row. The row is described by BNF as follows.

<row> <tbldef><cell>+\row
<cell> <textpar>+\cell

From a non-terminal element <tbldef>, which is a table definition, a control word specifying the layout of the whole row and individual cells is derived as a terminal element. Layouts regarding cells which can be specified are ruled lines, hatching pattern and hatching color. From non-terminal element <textpar>, a control word regarding a string corresponding to a value of the cell and layout thereof is derived as a terminal element. As described above, layouts regarding strings which can be specified are character color, character background color, font, or the like.

Now the construction and operation of the first embodiment is described.

FIG. 1 shows the construction of the first embodiment. The relations between functional components and means constituting the invention are as follows:

information inputting means (image information inputting means)=input file storing component+target file holding components;

element detecting means (cell detecting means)=cell control word detecting component 107;

element value detecting means (cell value detecting means)=cell value comparison component 108;

emphasis determination means=cell value comparison component 108+cell value-color correspondence table holding component 105; and image information generation means=character color definition insertion component 106+color specification control word insertion component 109.

The following are roles of the functional components of the embodiment, which are itemized for making it easily understandable.

Figure 5:
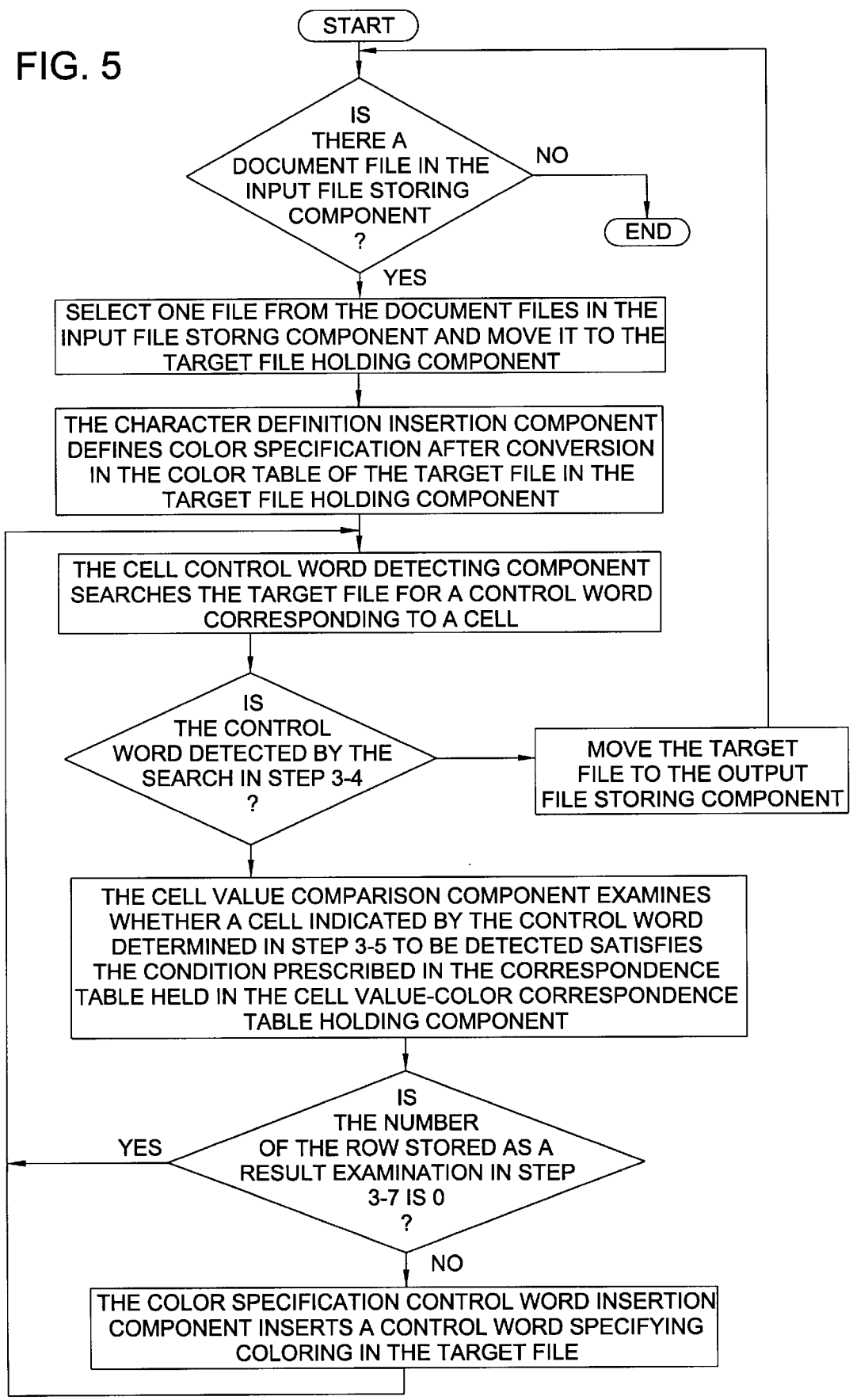
FIG. 5 shows a flow of overall processing of the first embodiment carried out by a processing control component.

(A1) Process control component 101:

(1—1) generally controlling the whole conversion processes. The flow of the processes is shown in FIG. 5 and is described later.

(A2) Input file storing component 102:

(2-1) storing a monochrome RTF file to be converted into a color document.

(2-2) being capable of storing plural RTF files.

(2-3) being connected to other document processing systems through a network 111 and capable of receiving an RTF file transmitted from the other document processing system to the present apparatus.

(A3) Target file holding component 103:

(3-1) holding an RTF file which is in a process of conversion into a color document (hereinafter, referred to as a target file).

(3-2) being capable of holding only one file. (3—3) the cell control word detecting component 107, the character color definition insertion component 106 and the color specification control word insertion component 109 access the file held by this functional component and change the contents of the file if necessary.

(A4) Output file storing component 104:

(4-1) storing the RTF file converted into a color document.

(4-2) being capable of storing plural RTF files.

(4-3) being connected to other document processing systems through the network 111 and capable of transmitting the RTF file stored in the present functional component to the other document processing system when it accesses the document processing apparatus of the present invention.

(A5) Cell value-color correspondence table holding component 105:

(5-1) holding table form data in which conditions on the cell value, RGB value and index of the color table of the target file are corresponding to one another. The example is shown in FIG. 2. In the figure, values of items in the correspondence table are as follows:

To the item "condition symbol", a symbol representing a condition formula is assigned, which is any of=(equal), > (greater than), ≧ (greater than or equal to), ≦ (less than or equal to) and < (less than). If a range of a value is provided as a condition, the range is expressed by a sequence of two of the symbols >, ≧, <, and ≦. For example, a sequence of symbols ≧< represents "greater than or equal to X and less than Y" (the boundary values X and Y are provided as the item "condition value").

To the item "condition value", a value provided as a condition is assigned. The value may be a numeric value or a string, and moreover, it can be plural values. If discrete values are shown, a semicolon is inserted between them. If a pair of numeric values represent a range, a comma is inserted between them. For example, line 2 of FIG. 2 indicates that "equal to 1,000 or 2,000" as a condition and line 3 of FIG. 2 indicates "greater than or equal to 500 and less than 800" as a condition.

To the item "character color", based on the condition shown by the pair of a "condition symbol" and a "condition value" in the same row, a color for changing the character color of a cell having a value satisfying the condition is assigned. The color is described as an RGB definition in the color table. If ";" is described as this value, it is indicated that a default value is applied.

To the item "IdxF", an index of the color table of the target file in conformance with the value of "character color" in the same row is assigned.

To the item "cell area color", based on the condition shown by the pair of a "condition symbol" and a "condition value" in the same row, a color for changing the cell area color of a cell having a value satisfying the condition is assigned. The color is described as an RGB definition in the color table. If ";" is described as this value, a default value is applied.

To the item "IdxB", an index of the color table of the target file in conformance with the value of "cell area color" in the same row is assigned.

Here, values of items "condition symbol", "condition value", "character value" and "cell area value" are fixed, but values of "IdxF" and "IdxB" are variable per every target file.

(5-2) character color definition insertion component 106 utilizes the present functional component for setting a color used in the converted document in the file.

(5-3) cell value comparison component 108 utilizes the present functional component for examining whether a value of the cell satisfies a condition.

(5-4) color specification control word insertion component 109 utilizes the present functional component for substituting a control word in the file.

(A6) character color definition insertion component 106:

(6-1) set colors used in the converted document in the color table of the target file.

(6-2) set indexes in the color table of the target file in the items "IdxF" and "IdxB" of the correspondence table held in the cell value-color correspondence table holding component 105.

Figure 3:
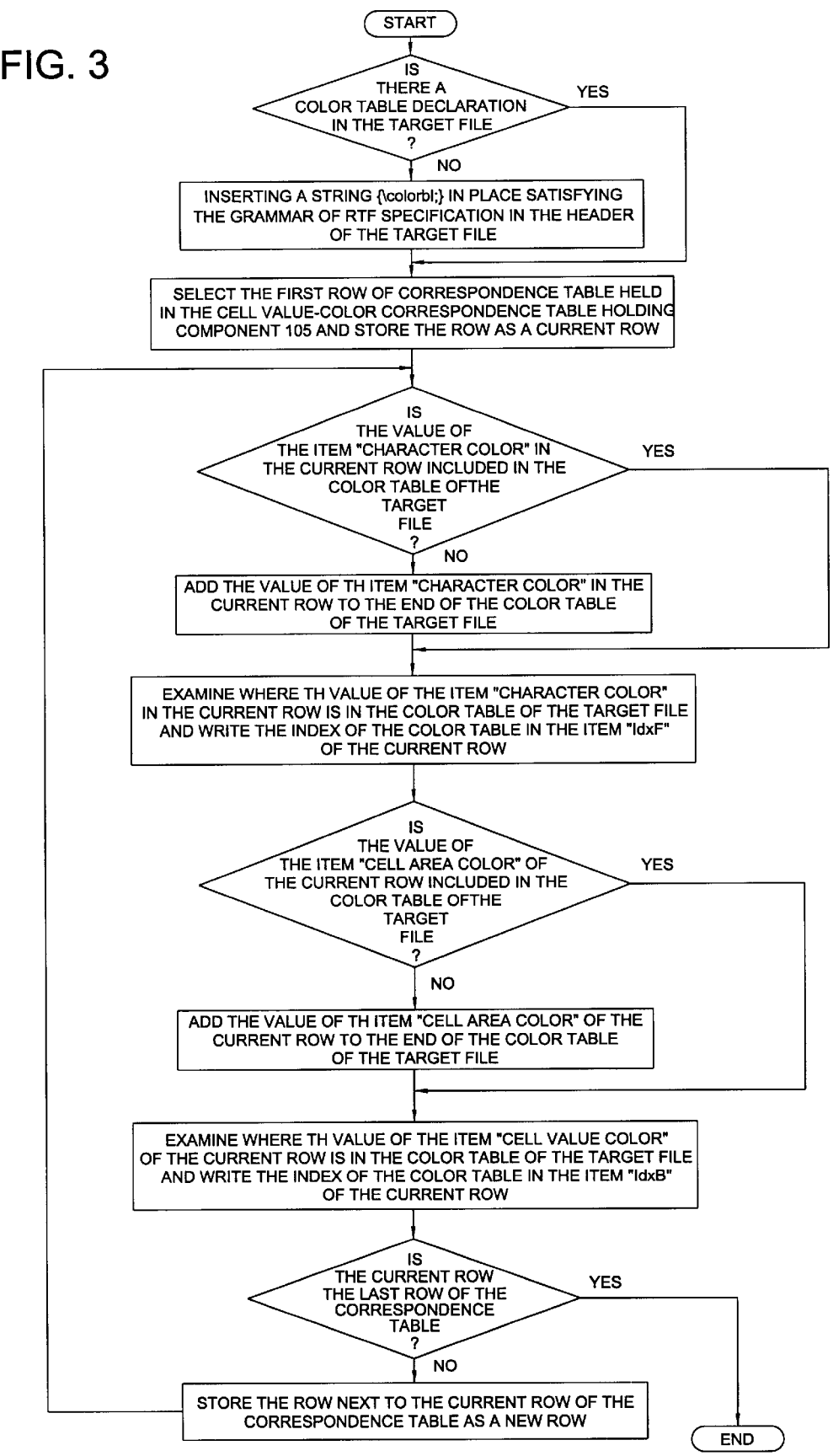
FIG. 3 shows a flow of processing in a character color definition insertion component.

The flow of processing of the character color definition insertion component is now described based on FIG. 3.

Step 1—1: examine whether there is a color table declaration in the target file. If there is no color table, the process proceeds to step 1-2. If there is a color table, the process proceeds to step 1-3.

Step 1-2: make a color table by inserting a string {\colortbl;} in a place satisfying the grammar of RTF Specification in the header of the target file.

Step 1-3: select the first row of the correspondence table (see the example of FIG. 2) held in the cell value-color correspondence table holding component 105 and store the row as a current row.

Step 1-4: examine whether the value of the item "character color" in the current row is included in the color table of the target file. If the value is included in the color table, the process proceeds to step 1-6. If the value is not included in the color table, the process proceeds to step 1-5.

Step 1-5: add the value of the item "character color" in the current row to the end of the color table of the target file.

Step 1-6: examine where the value of the item "character color" in the current row is in the color table of the target file and write the index of the color table in the item "IdxF" of the current row.

Step 1-7: examine whether the value of the item "cell area color" of the current row is included in the color table of the target file. If the value is included in the color table, the process proceeds to step 1-9. If the value is not included in the color table, the process proceeds to step 1-8.

Step 1-8: add the value of the item "cell area color" of the current row to the end of the color table of the target file.

Step 1-9: examine where the value of the item "cell area color" of the current row is in the color table of the target file and write the index of the color table in the item "IdxB" of the current line row.

Step 1-10: determine whether the current row is the last row of the correspondence table.

Step 1-11: based on the result of determination in step 1-10, if the current row is not the last row of the correspondence table, store the row next to the current row of the correspondence table held in the cell value-color correspondence table holding component 105 as a new current row to repeat the processing in steps 1-4 to 1-9. If the process reaches the last row of the correspondence tables it is terminated.

(A7) cell control word detecting component 107:

(7-1) search the target file and detect a control word \cell representing description of a cell in a table.

(7-2) store the position of the detected control word \cell in the file.

(7-3) search is started at the position in the file where the control word \cell is detected by the last search.

(7-4) cell value comparison component 108 utilizes the present functional component for detecting a cell value in the target file.

(7-5) color specification control word insertion component 109 utilizes the present functional component for inserting a control word indicating color specification in the target file.

(A8) cell value comparison component 108:

(8-1) compare a value of a cell with a condition prescribed in the correspondence table held in the cell value-color correspondence table holding component 105 and determine whether the cell satisfies the condition to store the determination result.

(8-2) the cell to be compared is indicated by the control word \cell stored in the cell control word detecting component 107.

(8-3) the cell value is a string including no control word (corresponding to a terminal element #PCDATA specified in the RTF Specification) immediately before the position of the control word \cell in the file stored in the cell control word detecting component 107. This value and the condition of the correspondence table are compared with each other from the first row of the table in order. If there is a cell value satisfying the condition, the order of the row including the value is stored. If there is no value satisfying the condition, 0 is stored.

(8-4) color specification control word insertion component 109 utilizes the present functional component for inserting a control word indicating color specification in the target file.

(A9) color specification control word insertion component 109:

(9-1) insert a control word specifying coloring of a cell in the target file.

(9-2) the cell to be colored is indicated by the control word \cell stored in the cell control word detecting component 107. Based on the correspondence table held in the cell value-color correspondence table holding component 105, the character color and inside area color of the cell having the cell value are changed. The change of the character color of the cell is carried out by changing a character attribute format for the string corresponding to the cell value. The change of the inside area color of the cell is carried out by changing line definition of the line in which the cell is included.

Figure 4:
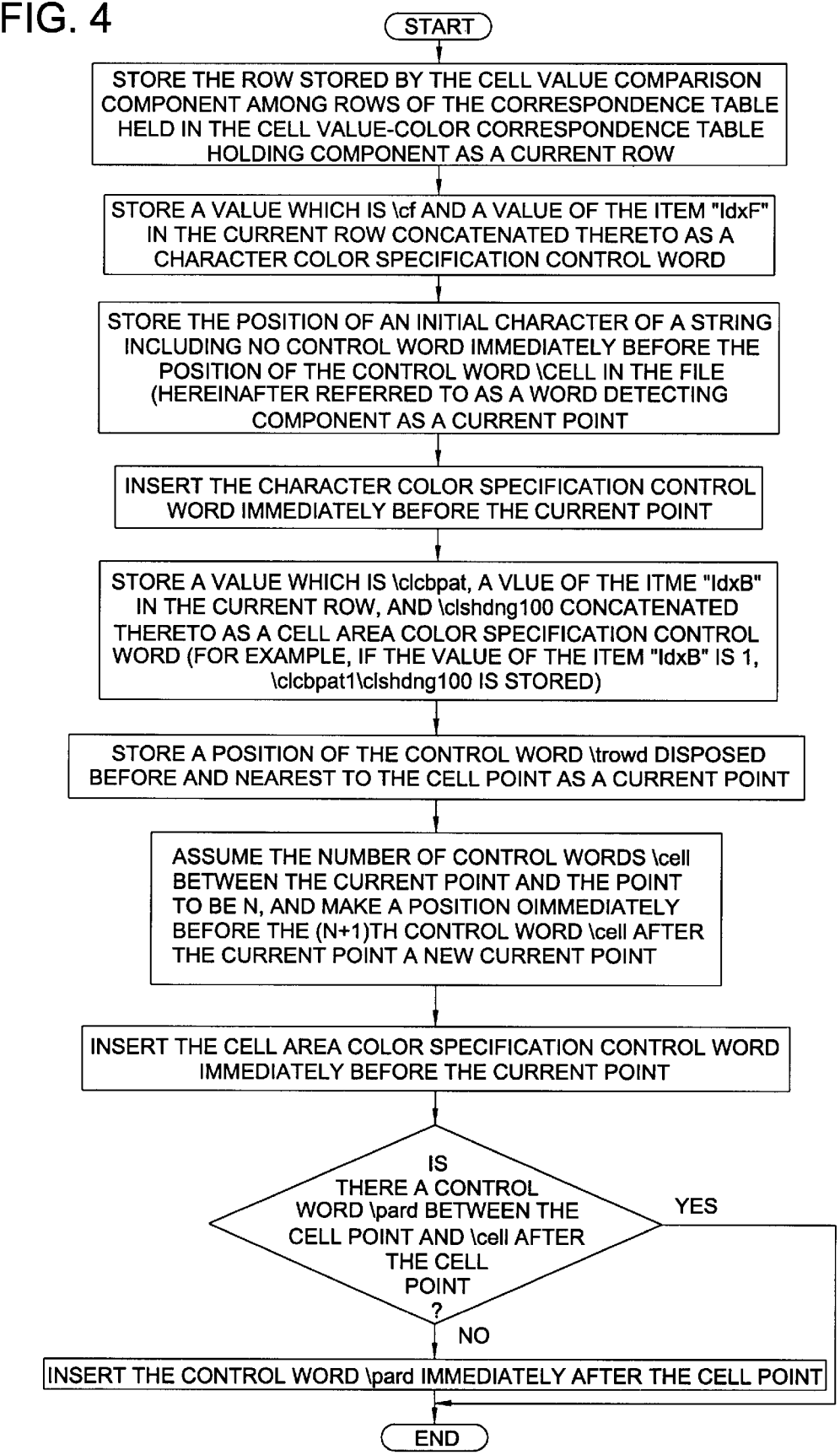
FIG. 4 shows a flow of processing in a color specification control insertion component.

Processing of the color specification control word insertion component 109 is described based on FIG. 4 showing the flow of the processing.

Step 2-1: store the row stored by the cell value comparison component 108 among lines of the correspondence table held in the cell value-color correspondence table holding component 105 as a current row.

Step 2-2: store a value which is \cf and a value of the item "IdxF" in the current row concatenated thereto as a character color specification control word.

Step 2-3: as a current point, store the position of an initial character of a string including no control word immediately before the position of the control word \cell in the file (hereinafter referred to as a cell point) stored in the cell control word detecting component 107.

Step 2-4: insert the character color specification control word immediately before the current point.

Step 2-5: store a value which is \clcbpat, a value of the item "IdxB" in the current row and \clshdng100 concatenated thereto as a cell area color specification control word (for example, if the value of the item "IdxB" is 1, \clcbpat1\clshdng100 is stored).

Step 2-6: as a current point, store a position of the control word \trowd disposed before and nearest to the cell point.

Step 2-7: assume the number of control words \cell between the current point and the cell point to be N, and make a position immediately before the (N+1)th control word \cell after the current point a new current point.

Step 2-8: insert the cell area color specification control word immediately before the current point.

Step 2-9: determine whether there is a control word \pard between the cell point and \cell after the cell point.

Step 2-10: insert the control word \pard immediately after the cell point.

The flow of the whole processing of the first embodiment is shown in FIG. 5. The processing is generally controlled and executed by the process control component 101.

Step 3-1: examine whether there is a document file in the input file storing component 102. If there is no document file, the process is terminated since there is no file to be processed. If there is a document file, the process proceeds to step 3-2.

Step 3-2: select one file from the document files in the input file storing component 102 and move it to the target file holding component 103.

Step 3—3: the character color definition insertion component 106 defines color specification after conversion in the color table of the target file in the target file holding component 103.

Step 3-4: the cell control word detecting component 107 searches the target file for a control word corresponding to a cell.

Step 3-5: determine whether the control word is detected by the search in step 3-4.

Step 3-6: as a result of determination of Step 3-5, if it is determined that the control word is not detected, move the target file to the output file storing component 104.

Step 3-7: the cell value comparison component 108 examines whether a cell indicated by the control word determined in step 3-5 to be detected satisfies the condition prescribed in the correspondence table held in the cell value-color correspondence table holding component.

Step 3-8: determine whether the number of the row stored as a result of examination in step 3-7 is 0 or not. As a result, if the number of the line is 0, the process returns to step 3-4.

Step 3-9: as a result of determination in step 3-8, if the number of stored row is not 0, the color specification control word insertion component 109 inserts a control word specifying coloring in the target file.

As described above, according to this embodiment, if the correspondence between the symbols and colors is set as shown in the cell value-color correspondence table in FIG. 2, for example:

with respect to the cell having a value less than 200, color of the characters of the value is converted into red;

with respect to the cell having a value of 1,000 or 2,000, it is converted so that the color of the character of the value is pale yellow and the inside area color of the cell is blue; and with respect to the cell having a value more than or equal to 500 and less than 800, the inside area color of the cell is converted into red.

The table in FIG. 6(*a*) is converted into the table in FIG. 6(*b*).

The first embodiment can be carried out with the following modifications.

EXAMPLE 1

A format conversion function for converting any file format into the RTF file format is provided to the input file storing component 102, whereby color conversion process can be performed on a document file in any file format.

EXAMPLE 2

A format conversion function for converting the RTF file format into any file format having color description function is provided to the output file storing component 104, whereby a document file after color conversion process can be output in any file format. Moreover, the format conversion function has a function by which a user can select a file format so as to receive an output in a desired file format.

EXAMPLE 3

The cell value-color correspondence table holding component 105 is set so that a user can change the correspondence table held in the component, whereby correspondence between the cell value and color can be changed in accordance with user's preference. Further, the user is asked whether the change is temporary or permanent and the change is set in accordance with the answer. Therefore, in reply to the user's request, an effective period for the change can be set. When the user changes the correspondence between the cell value and color, he/she can use a UI for selecting at least one correspondence between the cell value and color from displayed examples of cell values and colors other than directly inputting a value in the correspondence table, thus reducing the load of the user. The change of the correspondence table may be carried out by substituting a new table or by updating a part of the table.

EXAMPLE 4

An item concerning the font (possible values are control words concerning font of the character format properties, for example, \i or \out1) is added to the correspondence table in the cell value-color correspondence table holding component 105, and the value of this item is inserted subsequent to the control word for color specification when the color specification control word insertion component 109 carries out insertion of the control word for character color specification in the file. Accordingly, character color and font of the cell value can be changed at the same time. For example, it becomes possible to convert a monochrome character into a red-outlined character. More various expressions can be obtained simply and easily.

EXAMPLE 5

An item concerning the hatching pattern inside of the cell (possible values are control words derived from the non-terminal element <cellshad> in the RTF Specification, for example, \clshdngN or \clbgbdiag) is added to the correspondence table in the cell value-color correspondence table holding component 105, and the value of this item is inserted subsequent to the control word for color specification when the color specification control word insertion component 109 carries out insertion of the control word for area color specification in the file. Accordingly, inside area color of the cell and the hatching pattern can be changed at the same time. For example, adding red hatching lines or inserting blue dot pattern is available. Therefore, more various expressions can be obtained simply and easily.

EXAMPLE 6

An item concerning the color of the border of the cell (possible values are the same as those for the character color or the like) is added to the correspondence table in the cell value-color correspondence table holding component 105, and a control word for specification of color of the ruled line \brdrcf is also inserted when the color specification control word insertion component 109 carries out insertion of the control word for specification of inside area color of the cell in the file. Accordingly, the inside area color of the cell and the color of the border can be changed at the same time. For example, it is possible to make a cell having pale yellow area color and a red border. Therefore, more various expressions can be obtained simply and easily.

EXAMPLE 7

An item concerning the form of the border of the cell (possible values are control words derived from a non-terminal element <brdr> in the RTF Specification, for example, \brdrdb) is added to the correspondence table in the cell value-color correspondence table holding component 105, and the value of this item is used for substituting the border of the cell when the color specification control word insertion component 109 carries out insertion of the control word for area color specification. Accordingly, the inside area color of the cell and the form of the border of the cell can be changed at the same time. More various expressions, such as a cell having a pale yellow area color and a double border, can be obtained simply and easily.

EXAMPLE 8

A function for specifying a table which the user desires to convert is added to the cell control word detecting component 107, that is, the cell control word detecting component 107 detects only the cells belonging to a particular table in accordance with user's instruction. For example, a UI by which the user inputs numeric values indicating tables to be converted is disposed and the cell control word detecting component 107 stores the input numeric value, reads the input files from the first one, counts and stores the number of appearances of table description, and runs over the tables until the number of appearances of table descriptions reaches the specified numeric value. If the number of appearances of table descriptions reaches the given numeric value, processing as same as that of the first embodiment are performed on the control word \cell included in the description of the table. In accordance with the RTF Specification, in the case where a control word \trowd appears and a control word immediately before is not \row, start of a new table description is ensured. Therefore, the check of the appearance of the control word \trowd by the cell control word detecting component 107 suffices for examining the start of the new table description. According to realization of function described here, it becomes possible to modify specific tables among plural tables contained in a document.

EXAMPLE 9

Further to Example 8 in which a table desired to be converted can be specified, emphasis under different conditions per every table in a file can be realized by correlating specification of table and emphasis methods. For example, it will be realized as follows. The cell value-color correspondence table holding component 105 holds a plurality of correspondence tables. The user provides an instruction as to which correspondence table is used for each table in the input file. The instruction is stored in the cell value-color correspondence table holding component 105 as information in which a numeric value specifying the order of the table and a correspondence table are connected to each other. Since the cell control word detecting component stores the order of a table including the detected cell, the cell value comparison component and the color specification control word insertion component carry out processing utilizing a cell value-color correspondence table connected to the numeric value specifying the order of the table.

EXAMPLE 10

A functional component for inserting a legend representing what conditions are imposed for emphasis into the output file is added, whereby it will be easier for the user to read and understand the contents of tables. This will be, for example, realized as follows. The new functional component stores at least one value in a correspondence table held in the cell value-color correspondence table holding component and at least one string used for displaying the legend. The stored value and string correspond to each other. The correspondence between the value and the string is stored in the format (\red225\green0\blue0; "red"), (\red0\green0\blue225; "blue"), according to, for example, a tuple format. This functional component also stores example sentences for displaying the legend corresponding to condition symbols in the correspondence table. For instance, the correspondence is stored in a format such as ("less than" <[condition value] "character color is" [character color] "cell color is" [cell area color] "."). Here, the square-bracketed item names are replaced with strings corresponding to the values of those items. This functional component generates a string by enclosing words in the brackets per every row in the cell value-color correspondence table, and inserts the string, in which a control word \pard is added to the head and a control word \par is added to the end, at the end of table description in the file. Thereby description of legend is added to the output file. Moreover, a legend appealing to the eye can be obtained by making the RTF description which generates figures such as a red rectangle correspond to the tuple, instead of inserting a string such as "red".

Furthermore, with respect to the first embodiment, the RTF is used as the file format of the processing data in the above examples, but any file format may be used as long as it has the same or more capability of coloring and marking description as that of the RTF. As the data structure of the correspondence table, a table format is used in the above examples, but any data construction will do if the color description can be obtained based on the cell value.

SECOND EMBODIMENT

A Copying Machine with Edit Function

The purpose of this embodiment, a copying machine, is to read a monochrome document including a pie graph which the user desires to change its layout and marks with a marker, and to detect the marked pie graph for coloring its graph elements, thus outputting a color document.

In this embodiment, the user enclose the pie graph in the monochrome document that he/she desires to color with a marker. The user also provides an instruction regarding processing such as "color the same elements in the same color" or "color the elements indicating a specific percentage or more" through a condition specifying component 707. The user puts the marked monochrome document on a document reading component and provides an instruction of start copying to a process control component 702, and then a document is output in which the marked graph elements are colored to meet the purpose of use.

Figure 7:
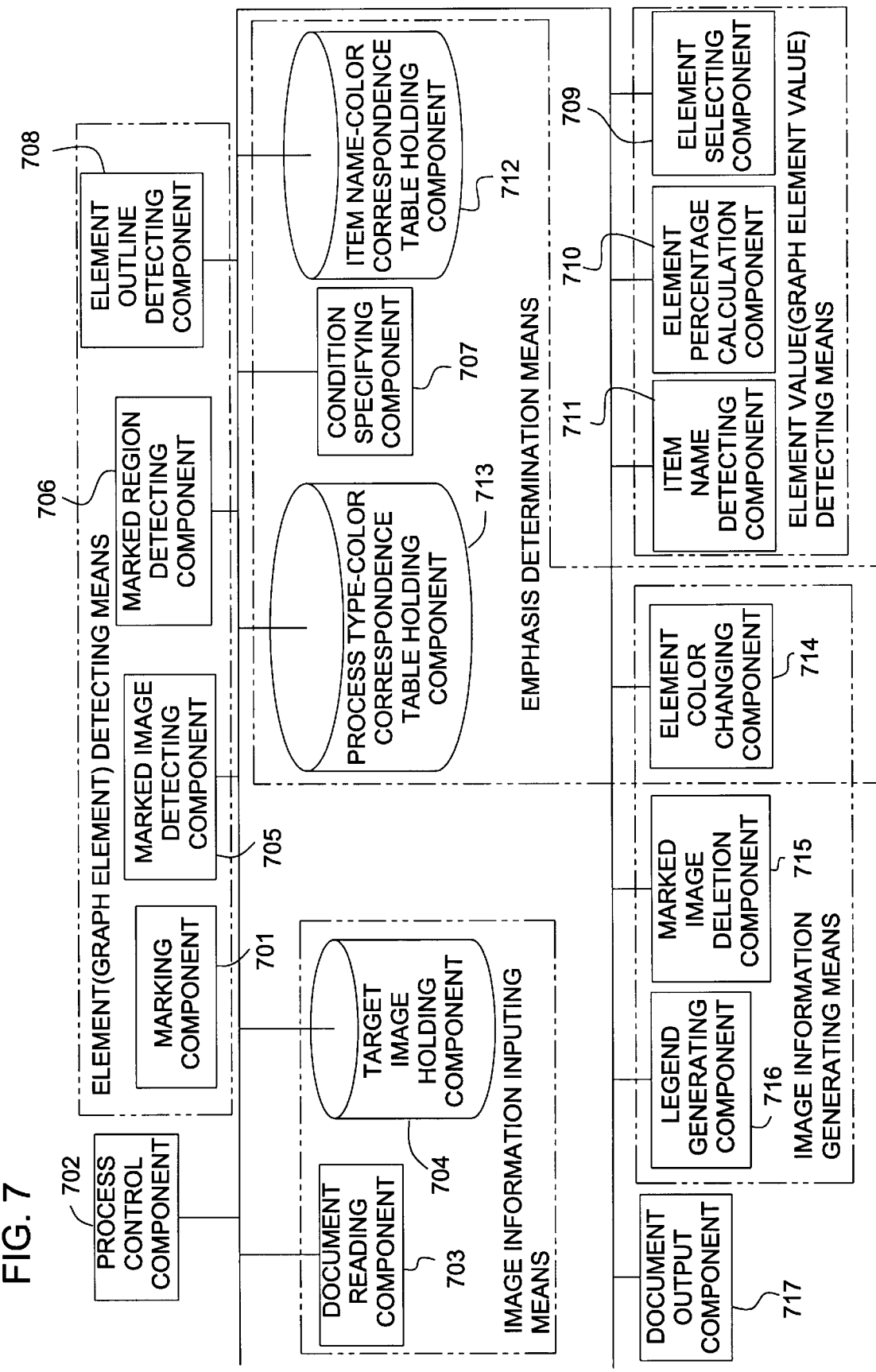
FIG. 7 shows a construction of a second embodiment of the document processing apparatus according to the present invention.

The construction of the second embodiment is shown in FIG. 7. The relations between functional components and means constituting the invention are as follows:

information inputting means (image information inputting means)=document reading component 703+target image holding component 704;

element detecting means (graph element detecting means)=marking component 701+marked image detecting component 705+marked region detecting component 706+element outline detecting component 708;

element value detecting means (graph element value detecting means)=element selecting component 709+item name detecting component 711+element percentage calculation component 710;

emphasis determination means=condition specifying component 707+process type-color correspondence table holding component 713+item name-color correspondence table holding component 712+element color changing component 714; and image information generating means=element color changing component 714+marked image deletion component 715=legend image generating component 716.

(B1) Marking component 701

(1—1) having a function for providing a mark on a monochrome document which is read by the document reading component.

(1-2) marking is carried out by a single marker having a specific color.

(B2) Process control component 702

(2-1) having a function for generally controlling the whole processes (the flow of processing will be described later with reference to FIGS. 12 and 13).

(2—2) having a function for executing the whole processes in accordance with the instructions about copying volume and start of copying from the user, and therefore equipped with UI such as buttons or a touch panel.

(B3) Document reading component 703

(3-1) scanning target monochrome document and resolving it into optical primary colors R (red), G (green) and B (blue) to generate a digital color image of 256 gray levels, and making the target image holding component 704 hold the data.

Figure 8:
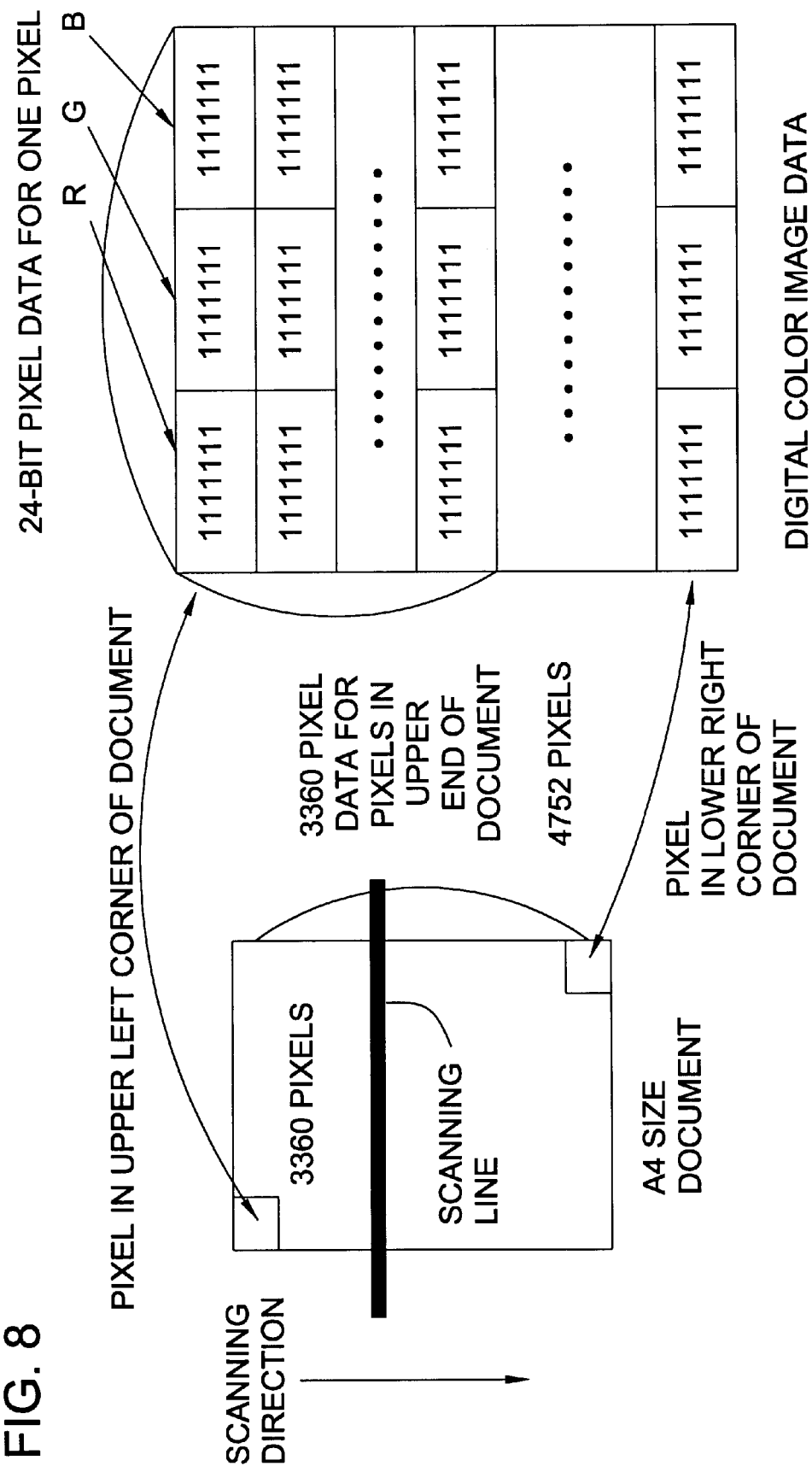
FIG. 8 illustrates a color image input by a document reading component.

(3-2) one pixel of generated digital color image data covers an area of 0.0625 mm$^2$ in the document (16×16 pixels per 1 mm$^2$, approximately 400 dpi resolution), and is represented by 24 bits (successive 3-byte data, see FIG. 8). First 8 bits of 24 bits indicate the 256-gray-level data for R, next 8 bits indicate the 256-gray-level data for G, and the last 8 bits indicate the 256-gray-level data for B. All bits being 1 indicate white, and on the contrary, all bits being 0 indicate black.

(3-3) The digital image data obtained by a single scanning process covers an area corresponding to a single A4 size sheet, which is represented by successive 3360×4752 image data (see FIG. 8). The order of pixel data is determined uniquely based on the position of pixel data in the document. The order conforms to the optical scanning process in which a scanning line (realized by a CCD) in parallel with a shorter side of the document is moved in the direction of the longitudinal side. If it is assumed that the A4 size sheet is placed vertically, pixels from the first one to the 3360th one located at the upper end of the document by arranging pixels in the order from left to right, and supposing 3360 pixels to be one set of pixel data, 4752 sets of pixel data are hereinafter arranged from the top to the bottom of the document.

(B4) Target image holding component 704

(4-1) holding digital color image data to be a target (hereinafter referred to as a target image).

(4-2) data size of the target image data is about 46 Mbytes.

(B5) Marked image detecting component 705

(5-1) detecting one set of pixel data corresponding to a mark from the target image and storing it.

(5-2) the set of the pixel data corresponding to the mark is a group of pixel data which is successive in the document and has a marker color (including an allowable region).

(5-3) the marker color is measured in advance and converted into an pixel data format to be stored in this functional component. Values belonging to an allowable range of this marker color are also stored.

(5-4) detected set of pixel data is stored as a set in which addresses of image data are the elements (hereinafter referred to as marked pixel set). The mechanism for storing the set controls the addition of the elements so as to avoid duplication (that is, all addresses, which are elements, are different from each other).

(5—5) in this functional component, process proceeds in accordance with the following recursive algorithm:

Step 5-1: if the marked pixel data set which has been stored has an element, delete the entire set.

Step 5-2: select one from the pixel data of the target image, which conforms with the marker color or its allowable range which have been stored, and an address of the selected pixel data is stored as the current address.

Step 5-3: add the current address to the marked pixel set.

Step 5-4: search for pixel data disposed at the positions upper, lower, left and right to the pixel data indicated by the current address in the document. If there is pixel data whose value conforms with the marker color or its allowable range and whose address is not included in the marked pixel set, store the address of the pixel data.

Step 5—5: assuming that the address of the pixel data stored in step 5-4 is a current address, repeat processing of steps 5-4 and 5-5 as long as the address satisfies the conditions shown in step 5-4.

(B6) Marked region detecting component 706

(6-1) detecting pixels located inside of a mark which has been detected by the marked image detecting component, and storing the addresses of the detected pixels.

Figure 9:
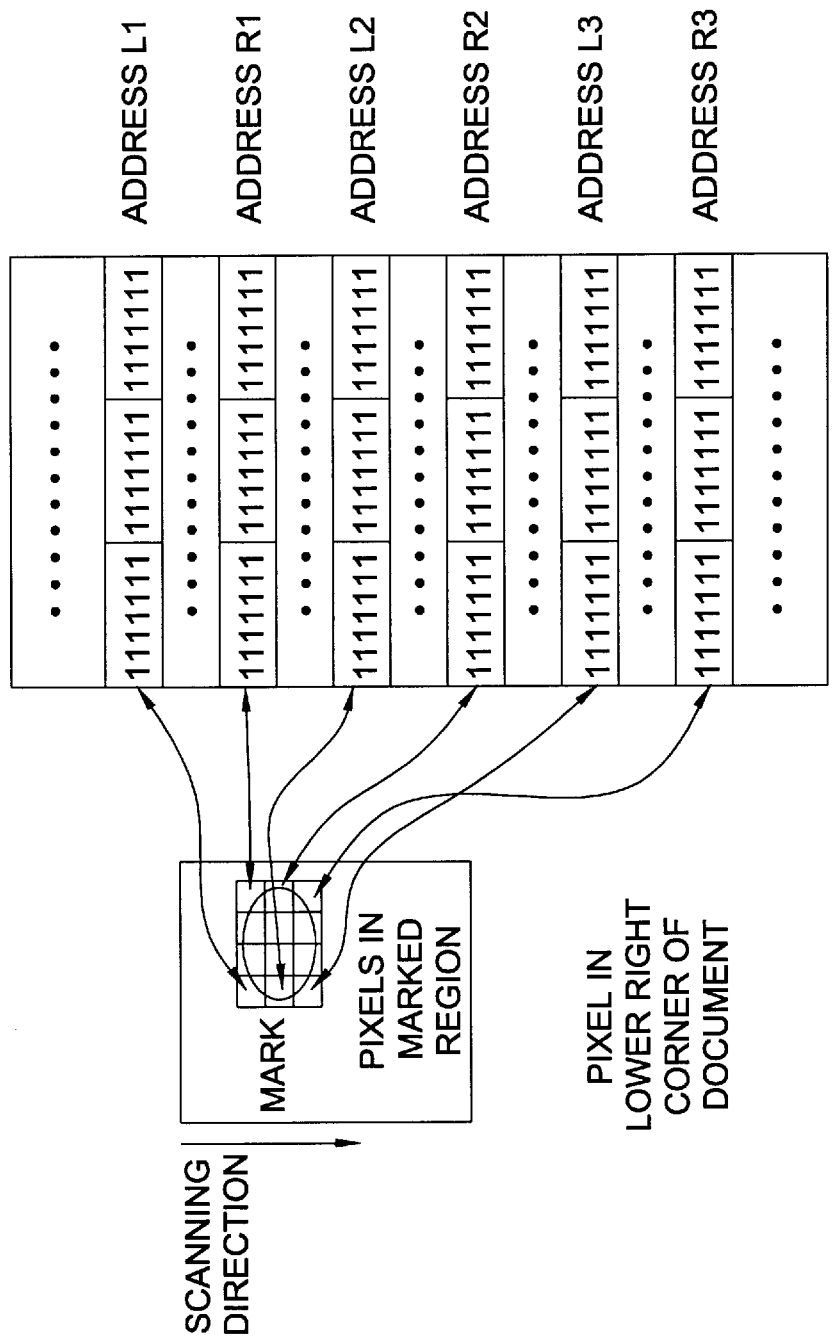
FIG. 9 illustrates detection of a marked region.

(6-2) data stored in this functional component indicates the range of addresses of the pixel data: in concrete terms, the data stored in this functional component is a set in which a pair of the starting point and the end point of the address is regarded as an element. Each of the sets corresponds to one scanning line (3360 pixels arranged in the direction of the shorter side of the document). FIG. 9 shows a concept of correspondence between the stored data and the mark.

(6-3) Steps of processing in this functional component are as follows: search for addresses of the leftmost pixel and the rightmost pixel in each scanning line from the addresses included in the marked pixel set stored in the marked image detecting component 705. Pair up these addresses per each scanning line and store a set consisting of these pairs.

(B7) Condition specifying component 707

(7-1) having a function such that the user can specifies the type of processing and conditions.

(7-2) The types of processing which can be specified are as follows: "color the same item in the same color", "color the portion indicating a specific percentage or more", "color the portion indicating more than a specific percentage", "color the portion indicating a specific percentage or less", and "color the portion indicating less than a specific percentage". Inside of the apparatus, these are distinguished with IDs task1, task2, task3, task4 and task5 (hereinafter, these IDs are referred to as process type IDs).

Figure 10A:
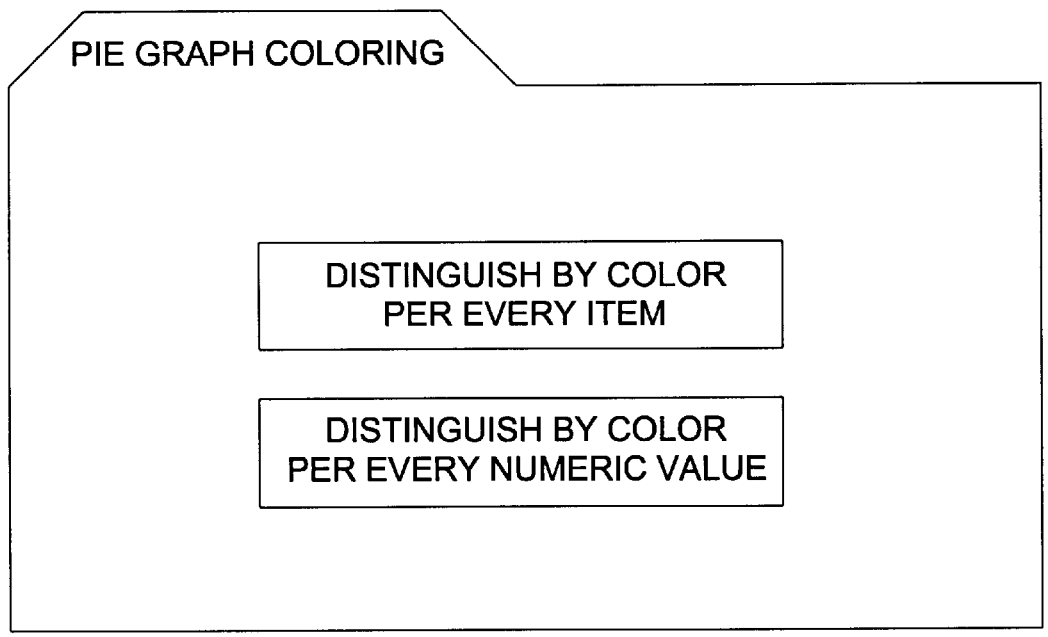
FIGS. 10(a) and 10(b) show examples of user interface of condition specifying component.
Figure 10B:
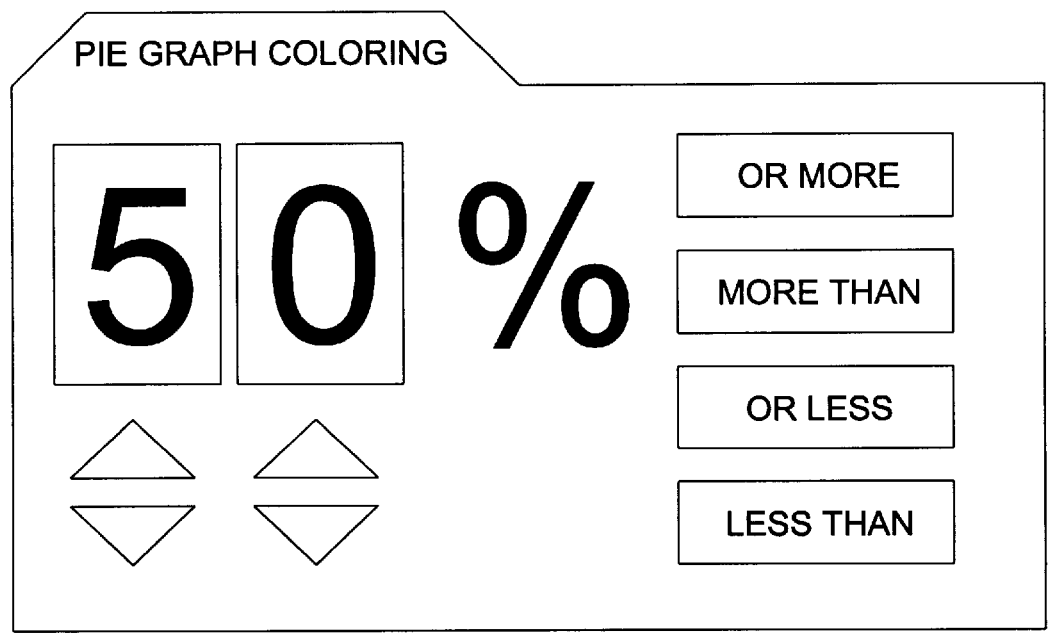

(7-3) as a UI for receiving user's instruction, a touch panel capable of image displaying is used. First, buttons indicating "distinguish by color per every item" and "distinguish by color per every numeric value" are displayed on the image (see FIG. 10(*a*)). If the button "distinguish by color per every item" is touched, task1 is selected and the displayed button is highlighted. If the button "distinguish by color per every numeric value" is selected, display is changed to an image where any of "or more", "more than", "or less" and "less than", and numeric percentage value as a boundary value are input (see FIG. 10(*b*)). As shown in FIG. 10(*b*), "50" is displayed as an initial value of the boundary value, which can be changed by triangular buttons disposed below the boundary value display. If any of the buttons "more than", "or less" and "less than" is touched, one of task2, task3, task4 and task5, respectively, is selected. In this case, as same as the case of "distinguish by color per every item", display button is highlighted.

(7-4) storing the ID indicating specified process type and the boundary value.

(B8) Element outline detecting component 708

(8-1) detecting pixel data which forms an outline of a pie graph (including lines dividing the circle), and by using the detected pixel data, detect a set of pixel data which forms outlines of sectors, the elements of the pie graph, (hereinafter, referred to as element outline data set) and store it.

Figure 11A:
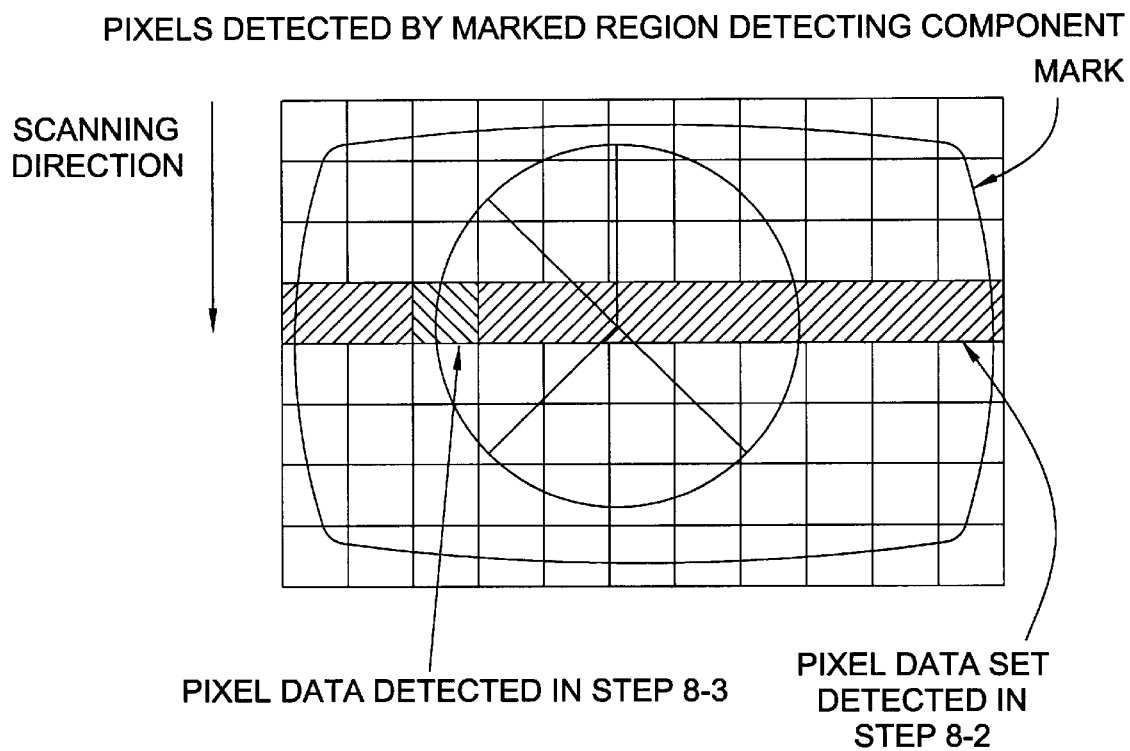
FIGS. 11(a) and 11(b) are an illustration of outline detection and an example of a legend image, respectively.

(8-2) The processing algorithm of this functional component is as follows. FIG. 11(*a*) supplements explanation for each step.

Step 8-1: when it is assumed that 3360 pixels arranged in the direction of the scanning line are one set, and that the set at the upper end of the document is the first set and the set at the lower end of the document is 4752th set, examine what range of sets includes the pixels detected by the marked region detecting component by utilizing these addresses of pixel data.

Step 8-2: detect a set which is located at the middle of the range of sets examined in step 8-1 (if the number of sets in the range is even number, an upper set of two sets nearest to the middle of the range).

Step 8-3: among the pixel data detected by the marked region detecting component 706 and included in the set which has been detected in step 8-2, detect pixel data which indicates black (that is, values of all the 24 bits are 0) and appears first in the image file (that is, a leftmost pixel in the document).

Step 8-4: assuming that the pixel data which has been detected in step 8-3 is a starting point of detection, and detect the sets of black pixel data subsequent to the starting point of detection and store them (as same as the algorithm in the marked image detecting component 705).

Step 8-5: assuming that the pixel data detected in the step 8-3 is the starting point of detection, and extract the sets of pixel data corresponding to the circumference from the sets of the pixel data stored in the step 8-4, and store them.

Step 8-6: divide sets of pixel data stored in step 8-4 except for pixel data stored in step 8-5 into a plurality of sets of pixel data each of which corresponds to a single circle-dividing line with reference to the center of a circle and a point of contact with a circumference, and store each set.

Step 8-7: form all the element outline data set from the sets of the pixel data stored in the steps 8-5 and 8-6, and store them as the result of processing in this functional component.

(B9) Element selection component 709

(9-1) selecting one set from the plural element outline data sets held in the element outline detecting component 709.

(9-2) if a selection history is held and a new set is to be selected, selecting a set which has not been selected yet.

(B10) Element percentage calculation component 710

(10-1) calculating percentages of elements of the pie graph based on the shape of the elements, and storing them.

(10-2) detecting the angle made by the circle-dividing lines from the element outline data set selected by the element selection component 709, and converting the angle into percentage.

(B11) Item name detecting component 711

(11-1) recognizing item names of the elements of the pie graph with reference to the target image, and storing them.

(11-2) the element regarded as a target is indicated by the element outline data set selected by the element selection component 709.

(11-3) extracting an image corresponding to the string located inside of the element of the pie graph, and carrying out character recognition on the image.

(11-4) holding data representing proportional characteristics of each character, and recognize a character by comparing the proportional characteristics with the extracted image.

(11-5) processing algorithm of this functional component is as follows:

Step 11-1: detect all pixels which indicate black and are located inside of the sector outline from the element outline data sets selected by the element selection component 709 and the pixel data sets stored in the marked region detecting component 706.

Step 11-2: calculate the smallest rectangular region (each of the four sides is parallel to corresponding side of the document) including all pixels detected in the step 11-1.

Step 11-3: generate a black-and-white bitmap by extracting the image inside of the element of the pie graph in accordance with the rectangular region calculated in step 11-2.

Step 11-4: divide the image into every character unit with reference to left and right margins in the black-and-white bitmap generated in step 11-3.

Step 11-5: uniquely determine the character indicated by each image in accordance with the divided image and stored character proportion data. Here, proportion is modified based on the ratio of height and width of the bitmap.

(11-6) notifying the recognized item name to an item name-color correspondence table holding component 712.

(B12) Item name-color correspondence table holding component 712

(12-1) holding a table form data in which an item name detected by the item name detecting component 711 corresponds to a color for coloring the graph element of each item.

(12-2) holding 16 types of colors which human beings can visually distinguish from one another. As same as the pixel data, the color data is represented by 24-bit data, which is fixed and not added/deleted.

(12-3) having a function for making the color data correspond to the item name notified by the item name detecting component 711. If there is no item name notified by the item name detecting component 711 in the correspondence table, the item name is made to correspond to a color which has not corresponded to anything. Every time the entire process is completed, this correspondence is reset.

(B13) Process type-color correspondence table holding component 713

(13-1) holding table form data in which the process type ID and the color for coloring the graph element correspond to each other.

(13-2) The color data is represented by 24-bit data, which is fixed and not added/deleted, as same as the pixel data.

(B14) Element color changing component 714

(14-1) changing the color inside of the element of the pie graph in accordance with determination of conditions.

(14-2) carrying out the change of color without imposing any conditions if the process type ID stored in the condition specifying component 707 is task1. Provided that result of comparison of the boundary value stored in the condition specifying component 707 and the percentage value stored in the element percentage calculation component 710 satisfies conditions of the process type (for example, in the case of task2, the percentage value $\geq$ the boundary value), carrying out the change of color if the process type ID is other than task1.

(14-3) detecting all pixels which are located inside of the outline of the graph element and indicate white (values of all 24 bits are 1) from the element outline data set selected by the element selection component 709 and the pixel data set stored in the marked region detecting component 706, and converting the data of these pixels into a particular RGB value which is determined as the following description in (14-4).

(14-4) searching the correspondence table held in the item name-color correspondence table holding component 712 and using the RGB value corresponding to the item name stored in the item name detecting component 711 if the process type ID stored in the condition specifying component 707 is task1. Searching the correspondence table held in the item name-color correspondence table holding component 712 and using the RGB value corresponding to the process type ID if the process type ID is other than task1.

(B15) Mark deletion component 715

(15-1) deleting an image corresponding to a mark from the target image so that the mark provided to the monochrome document is not found in the color document after conversion.

(15-2) changing values of all the pixel data indicated by the marked pixel set stored in the marked image detecting component 705 into those indicating white (values of 24 bits are all 1).

(B16) Legend image generation component 716

(16-1) having a function for generating a legend image showing coloring conditions and changing the target image so that the legend image is located near the graph.

Figure 11B:

(16-2) generating an image in which a color sample, a boundary value, colon, % and characters indicating process conditions are arranged and enclosed in a black rectangular frame (see FIG. 11(b)) if "distinguish by color per every numeric value" (any of process type IDs task2 to task5) is selected. The characters indicating process conditions are as follows: task2 indicates "or more", task3 indicates "more than", task4 indicates "or less" and task5 indicates "less than". The character fonts are held as a bitmap image in the legend image generation component 716. The color in the color sample is made to correspond to each process type ID.

(16-3) changing the pixel data of the target image so that the generated image is displayed on the top-right hand of each graph. If there is no sufficient space for inserting the legend image on the top-right hand of the graph, it is examined whether there is the space on the bottom-right, top-left or bottom-left of the graph in this order, and if there is the space, the legend image is inserted.

(B17) Document output component 717

(17-1) carrying out exposure with a laser beam and development based on digital color xerography technology, whereby a color image is printed on a sheet of paper.

(17-2) converting the target image represented by RGB into Y(yellow)M(magenta)C(cyan)K(black) data corresponding to colors of toner used in color copying. In this embodiment, since a developing cycle is required per each of Y, M, C and K toner, data corresponding to the toner used in each developing cycle is utilized.

(17-3) utilizing the process control component 702, making copies of the number of sheets specified by the user.

Figure 12:
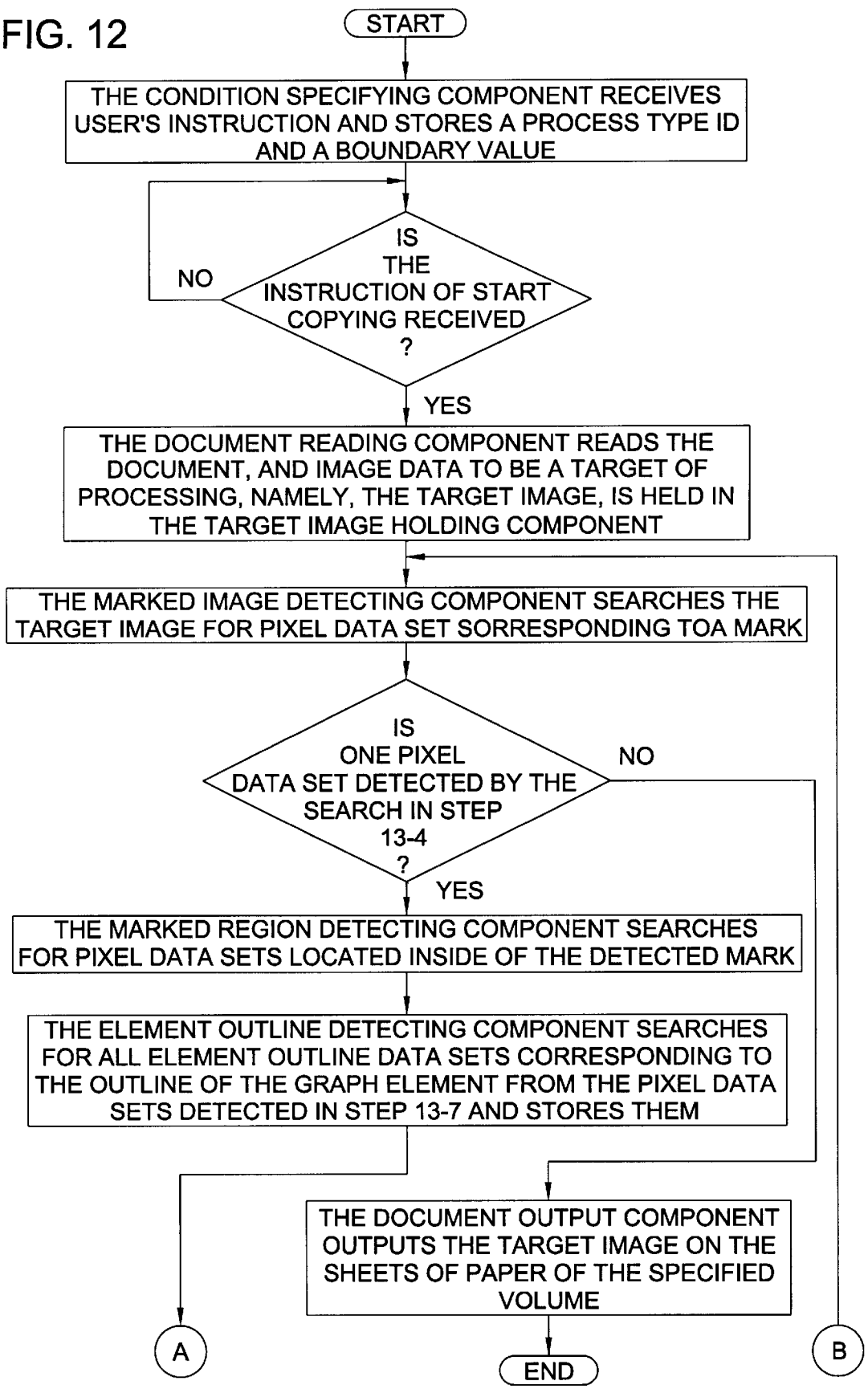

FIGS. 12 and 13 show the flow of processing in the second embodiment, which is generally controlled and carried out by the process control component 702.

Step 13-1: the condition specifying component 707 receives user's instruction and stores a process type ID and a boundary value.

Step 13-2: wait for the instruction of start copying, and the process proceeds to the next step when the instruction is received.

Step 13-3: the document reading component 703 reads the document, and image data to be a target of processing, namely, the target image is held in the target image holding component 704.

Step 13-4: the marked image detecting component 705 searches the target image for the pixel data set corresponding to a mark.

Step 13-5: determine whether one pixel data set is detected by the search in step 13-5.

Step 13-6: if it is determined in step 13-5 that no pixel data set is detected, the document output component 717 outputs the target image on the sheets of paper of the specified volume, thus terminating the process.

Step 13-7: if one pixel data set corresponding to a mark is detected in the search in step 13-5, the marked region detecting component 706 searches for the pixel data sets located inside of the detected mark.

Step 13-8: the element outline detecting component 708 searches for all element outline data sets corresponding to the outline of the graph element from the pixel data sets detected in step 13-7 and stores them.

Step 13-9: determine whether the process type ID stored in the condition specifying component 707 is task1. If the process type ID is task1, the process proceeds to step 13-10. If it is note the process proceeds to step 13-16.

Step 13-10: examine whether the element outline data set which has not been selected yet by the element selection component 709 is included in those stored in the element outline detecting component 708 or not.

Step 13-11: if there is no element outline data set which has not been selected yet, the marked image deletion component changes the value of pixel data corresponding to the mark so that the mark detected in step 13-4 may not appear in the output document.

Step 13-12: the legend image generation component 716 generates the legend image in accordance with the process type ID and changes the value of the pixel data of the target image so that the generated legend image can be represented in the output document. Then the process returns to the step 13-4 to search for the pixel data set corresponding to the next mark.

Step 13-13: If it is determined in step 13-10 that there is any element outline data set which has not been selected yet, the element selection component 709 selects one element outline data set.

Step 13-14: the item name detecting component 711 detects the item name of the graph element indicated by the selected element outline data set.

Step 13-15: the element color changing component 714 carries out coloring of the inside of the graph element indicated by the selected element outline data set, and the process returns to the step 13-10.

Step 13-16: examine whether the element outline data set which has not been selected yet by the element selection component 709 is included in those stored in the element outline detecting component 708 or not. If it is determined that there is no element outline data set which has not been selected, the process proceeds to step 13-11.

Step 13-17: if it is determined that there is any element outline data set which has not been selected yet, the element selection component 709 selects one element outline data set.

Step 13-18: the element percentage calculation component 710 calculates the percentage of the graph element indicated by the selected element outline data set and stores it.

Step 13-19: if the graph element indicated by the selected element outline data set satisfies the specified conditions, the element color changing component 714 carries out coloring of the inside of the graph element, and the process returns to the step 13-16 for the process of the next element outline data.

The second embodiment can be realized with the following modifications.

EXAMPLE 1

The element color changing component 714 does not change the inside color of the element of the pie graph, but changes the outline color of the element of the pie graph (that is, all the pixel data included in a specific element outline data set).

EXAMPLE 2

In the above example changing the color of the outline, emphasis can be given to the form of the outline by adding some operation to the element outline data set. For example, change of pixel color of the element outline data set into white (making values of all bits 1) results in giving emphases such as a broken line or a dashed-dotted line. By adding pixel data near the outline to the element outline data set and operating the value after addition, emphases for the outline form such as a thick or thin line or double line can be given.

EXAMPLE 3

As same as the correspondence between the color and the target of processing or the item name in the second embodiment, a function for holding the correspondence between the outline form and the target of processing and the correspondence between the outline form and the item name is newly assigned to the apparatus, and in accordance with these correspondences, the element color changing component provides some operations to the element outline data set. Thus the emphasis can be given to the outline form in accordance with the value of the graph element. Moreover, in this case, the graph elements can be distinguished without change of the outline color, it is no need to change the outline color. Furthermore, if the document output component 717 is set to output the document in monochrome (that is, by only a single development process of toner color K), the user can obtain a document in which the outlines of the graph is changed and easily distinguished at a lower cost.

EXAMPLE 4

The element color changing component 714 changes not only the inside color of the element of the pie graph, but also hatching patterns. The element color changing component 714 stores the masking patterns, and in accordance with them, partially changes the inside color of the pie graph. As the masking patterns, for example, patterns made of lines such as \\\\, /////, ||||| or ≡, combinations of such line patterns, or dot patterns including round or square dots can be employed.

EXAMPLE 5

As same as the correspondence between the color and the target of processing or item name in the second embodiment, a function for holding correspondence between the hatching pattern and the target of processing and correspondence between the hatching pattern and the item name is newly assigned to the apparatus, and in accordance with this correspondences, the element color changing component 714 carries out coloring. Thus the emphasis can be given to the inside area of the graph element in accordance with the value of the graph element. Moreover, in this case, the graph elements can be distinguished without change of the inside area color of the graph element, it is no need to change the inside color. Furthermore, if the document output component 717 is set to output the document in monochrome (that is, only by a single development process of toner color K), the user can obtain a document in which the element area of the graph is hatched and easily distinguished at a lower cost.

EXAMPLE 6

The item name detecting component 711 detects the item name not only from the pixels inside of the element of the pie graph, but extends the range of detection to the pixels near the circumference of the pie graph or a part where the leader line is drawn from the circumference.

EXAMPLE 7

If the element outline detecting component 708 is set to be able to detect the outline of rectangles and the item name detecting component 711 is set to be able to detect the characters inside of the rectangles or near the rectangles, and the element percentage calculation component 710 is set to be able to calculate the percentage based on the outline length of the rectangle by recognizing the coordinate system in the graph, the bar graph can be processed. This will be realized, for example, as follows.

Figure 14A:
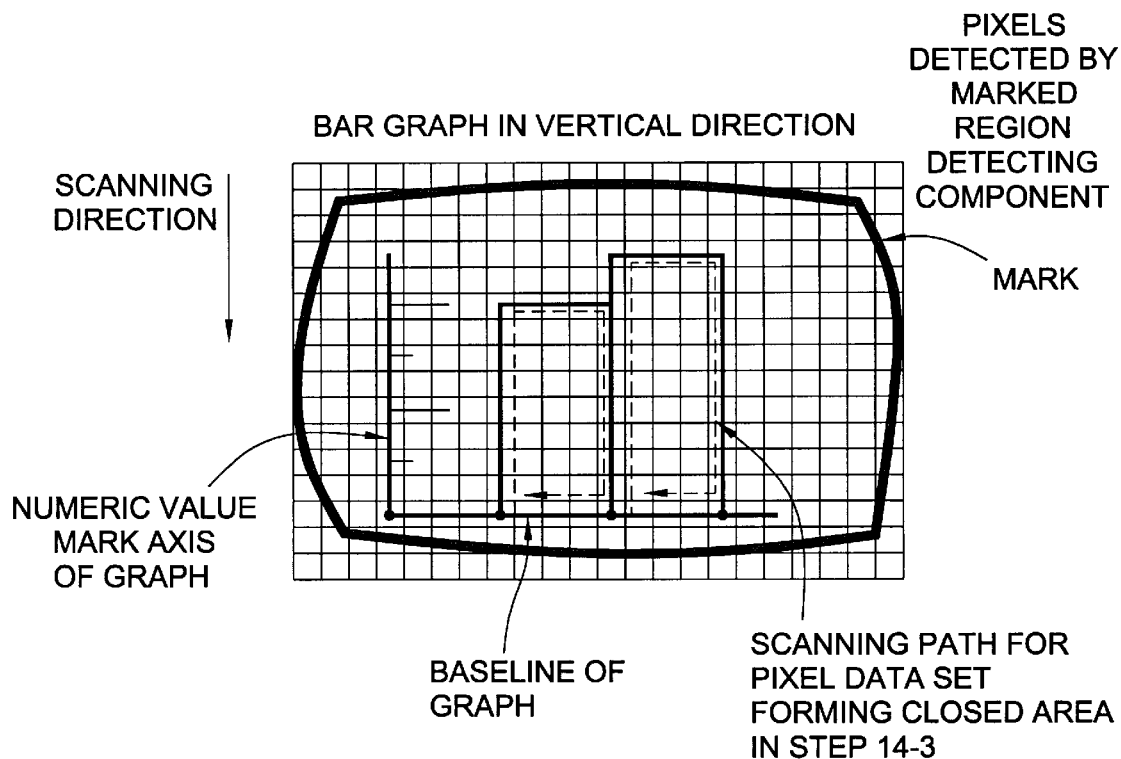
FIGS. 14(a) and 14(b) illustrate abstraction of an outline of a bar of a bar graph, 14(a) shows the case of the bar graph in a vertical direction and 14(b) shows the case of the bar graph in a horizontal direction.
Figure 14B:
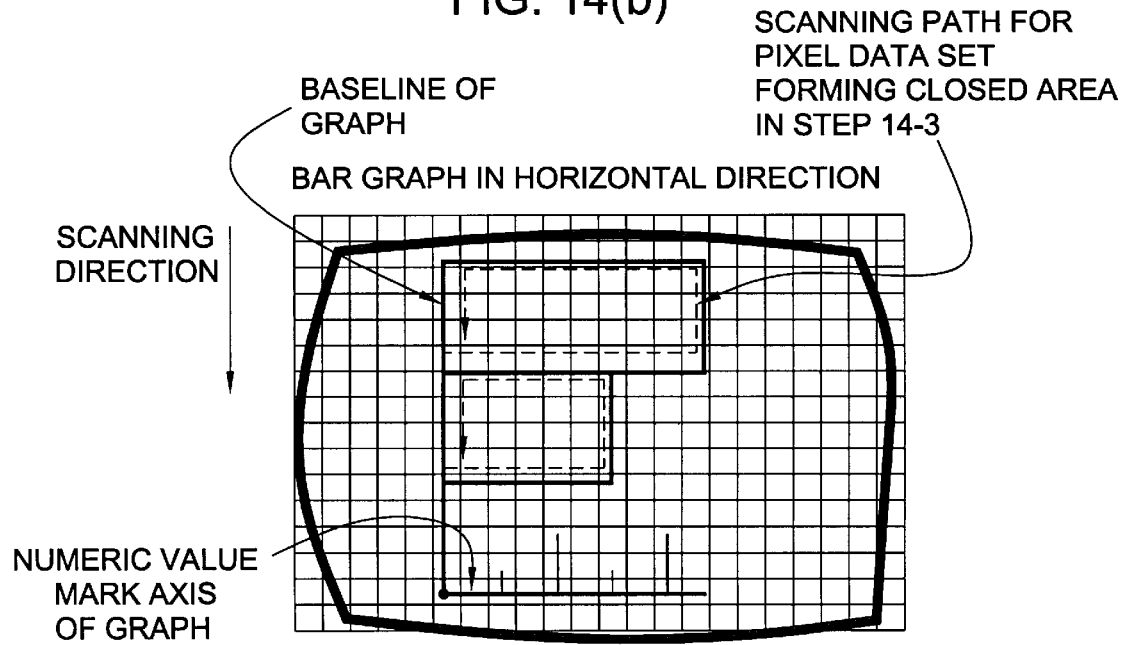

First, the element outline detecting component 708 extracts the outline of the bar with the following algorithm. For supplementing the explanation, FIG. 14 is referred to.

Step 14-1: search for pixel data set corresponding to the baseline of the graph, which satisfies the following conditions.

1) pixel set located in parallel with or orthogonal to the scanning line 2) 320 or more successive data being all black (that is, a successive line having length of 2 cm or more in on the document)

3) plural lines diverging from the baseline formed by those pixel data except for both ends, and the other end of the diverging line does not contact with any other lines (that is, it is not a graduation line).

Step 14-2: a detection starting point is:

a) the leftmost diverging point from the baseline of the graph (except for the end of the baseline) in the document if the baseline is in parallel with the scanning line; or b) the uppermost diverging point from the baseline of the graph (except for the end of the baseline) in the document if the baseline is orthogonal to the scanning line.

Step 14-3: from the detection starting point, search for the pixel data set forming a closed area by a scanning path shown in FIG. 14, and store them as a single element outline data set.

Step 14-4: shift the detection starting point along the baseline and carry out the process of step 14-3 on every shifted detection starting point to form all element outline data sets, and store them as a result of processing in this functional component.

As same as the second embodiment, the item name detecting component 711 carries out a process of recognizing characters on the pixels located inside of the element outline data set. If no string is found by the process, character recognition is carried out by searching baseline side of the graph and the opposite side of the graph in the near outside area of the image indicated by the element outline data set. The width of the area is as same as that of the bar, and the height corresponds to 160 pixels (1 cm) (see FIG. 15(*a*)).

The element percentage calculation component searches for numeric value mark axis to recognize the numeric value located near the numeric value mark axis and calculates and stores the unit system (that is, to what numeric value a single pixel corresponds?). By utilizing the unit system, to what numeric value the height of the certain bar, namely, the length (the number of pixels) of the outline orthogonally crossing the baseline of the graph corresponds is calculated.

EXAMPLE 8

In the second embodiment, the correspondence between the process type and the color and the correspondence between the item name and the color are fixed, but the embodiment can be modified so that the user can specify as he/she likes. It can also be specified that colors are changed per every target graph. As same as the emphasis example of the first embodiment, these can be realized by modifications of the correspondence table. There are many ways of carrying out specification: for example, panel operating, scanning a condition input sheet called a form or a check sheet in which the user describes the conditions, and inputting the conditions, utilizing the color or shape of the mark provided to the document, and so on.

EXAMPLE 9

In the second embodiment, only one numeric value condition is provided. For example, if a condition "color the portion representing 30% or more" is provided, only the graph elements representing 30% or more are colored. However, if it is set that the plural specifications can be held and coloring is carried out in accordance with the plural specifications, the user can provide a specification such that coloring of the graph elements indicating 30% or more and less than 15% is executed. As shown in the previous example, the colors can be set to be changed per every condition.

EXAMPLE 10

Figure 15A:
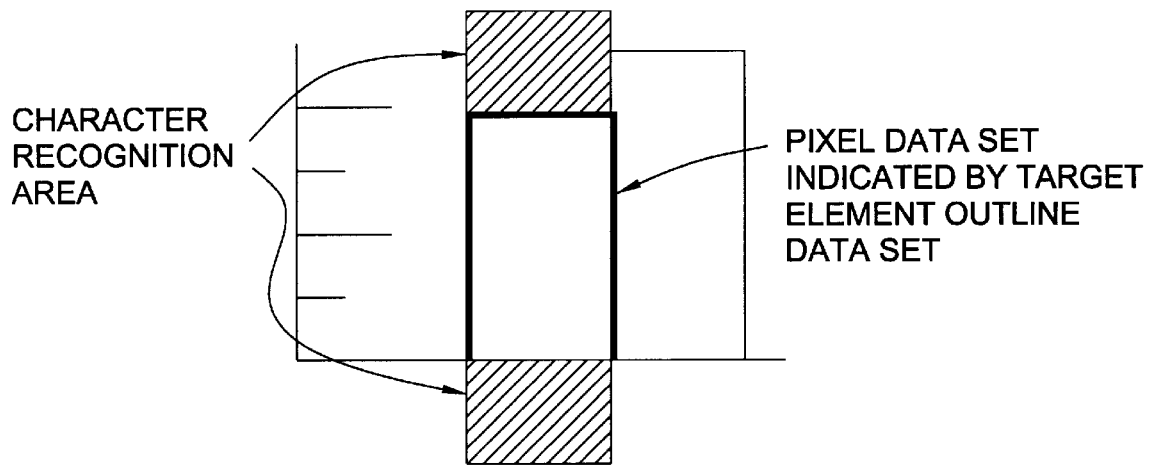
FIG. 15(a) shows a character recognition area for item name detection.
Figure 15B:
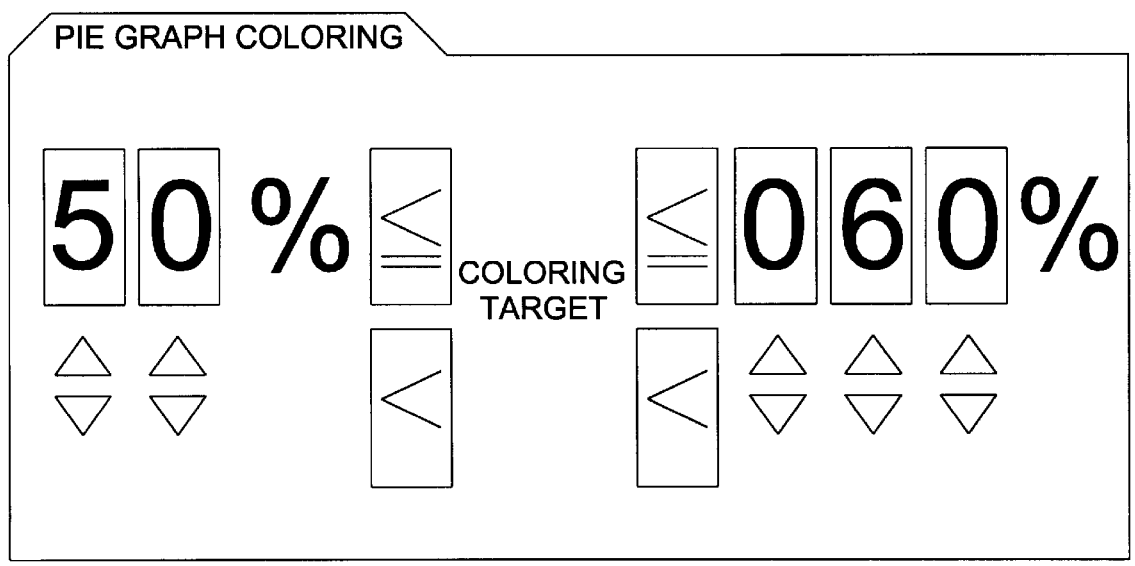
FIG. 15(b) shows an example of user interface of condition specifying component.

In the second example, instruction such as "some % or more and less than some %" cannot be made. However, if two boundary values can be held as same as the first embodiment and the UI shown in FIG. 10(*b*) is changed to the one such as shown in FIG. 15(*b*), for example, a specific region of the graph element can be colored. As same as the previous example, it is possible to provide specification of plural regions.

EXAMPLE 11

An image compressing functional component is added, and thereby the data capacity of the target image holding component can be reduced, and at the same time, the amount of pixel data detected by the mark detecting component or the marked region detecting component is also reduced; accordingly, the processing becomes speedy as a whole.

EXAMPLE 12

A functional component by which the user can provide marks to the target image is added, whereby the user can obtain a document in which marked characters are colored without marking the input document, namely, without stain on the input document.

THIRD EMBODIMENT

A Copying Machine with Edit Function

The purpose of this embodiment is to read a monochrome document in which a table whose layout is desired to be changed is marked with a marker, and to detect the table for outputting a color document in which the table is colored.

This embodiment is constituted as same as the second embodiment except for a function related to recognition and coloring of table, and therefore, explanations for the functional components having the same names and same functions as those of the second embodiment are omitted in the following description.

Figure 16:
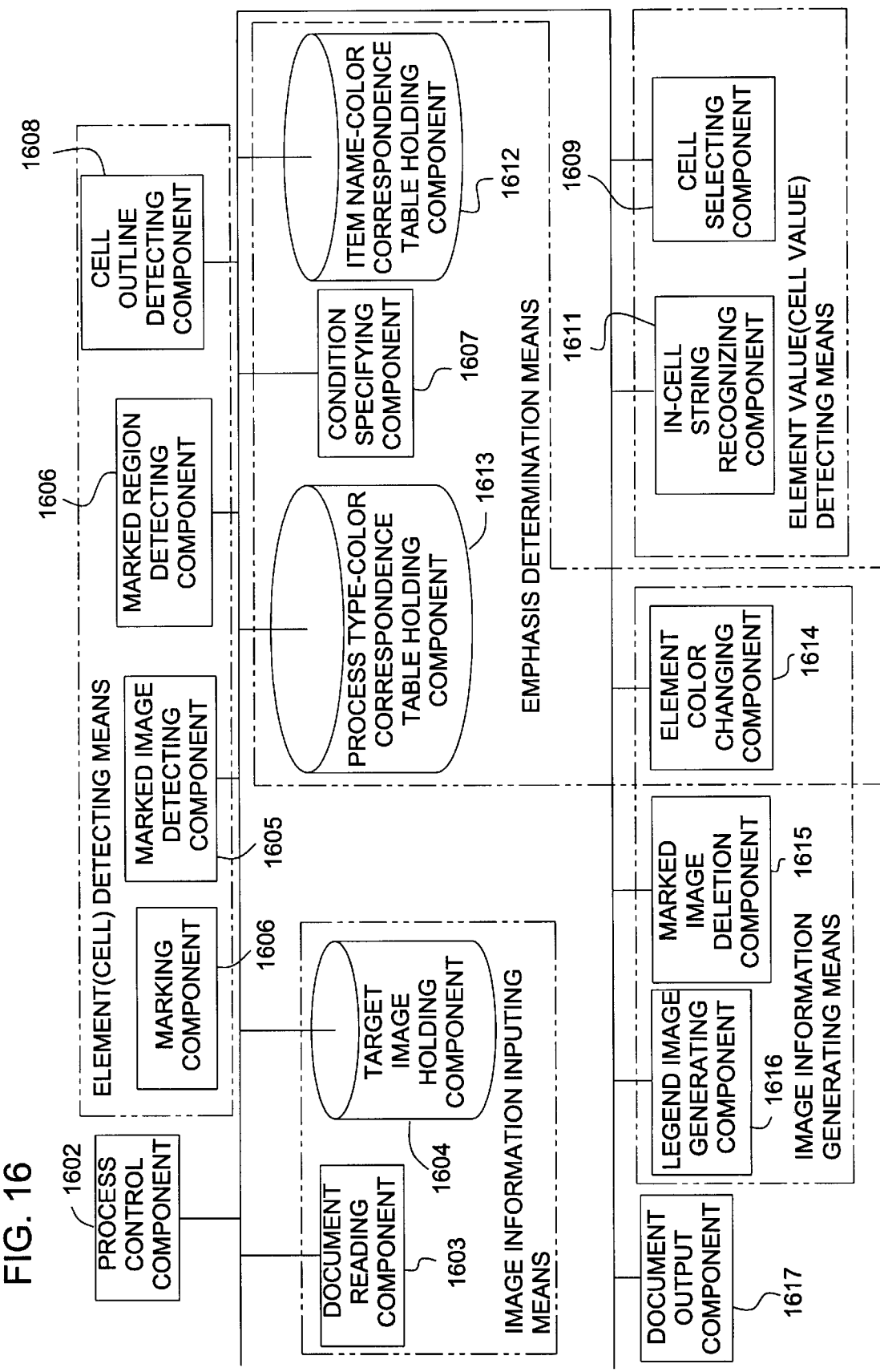
FIG. 16 shows a construction of a third embodiment of a document processing apparatus according to the present invention.

The construction of the third embodiment is shown in FIG. 16. The relations between functional components of this embodiment and means constituting the invention are as follows:

information inputting means (image information inputting means)=document reading component 1603+target image holding component 1604;

element detecting means (cell detecting means)=marking component 1601+marked image detecting component 1605+marked region detecting component 1606+cell outline detecting component 1608;

element value detecting means (cell value detecting means)=cell selection component 1609+in-cell string recognizing component 1611;

emphasis determination means=condition specifying component 1607+process type—color correspondence table holding component 1613+item name—color correspondence table holding component 1612+element color changing component 1614;

image information generation means=element color changing component 1614+marked image deletion component 1615+legend image generation component 1616.

(C1) Cell outline detecting component 1608

(1—1) detecting pixel data set forming an outline of the cell (hereinafter, referred to as the element outline data set) and store it.

Figure 17:
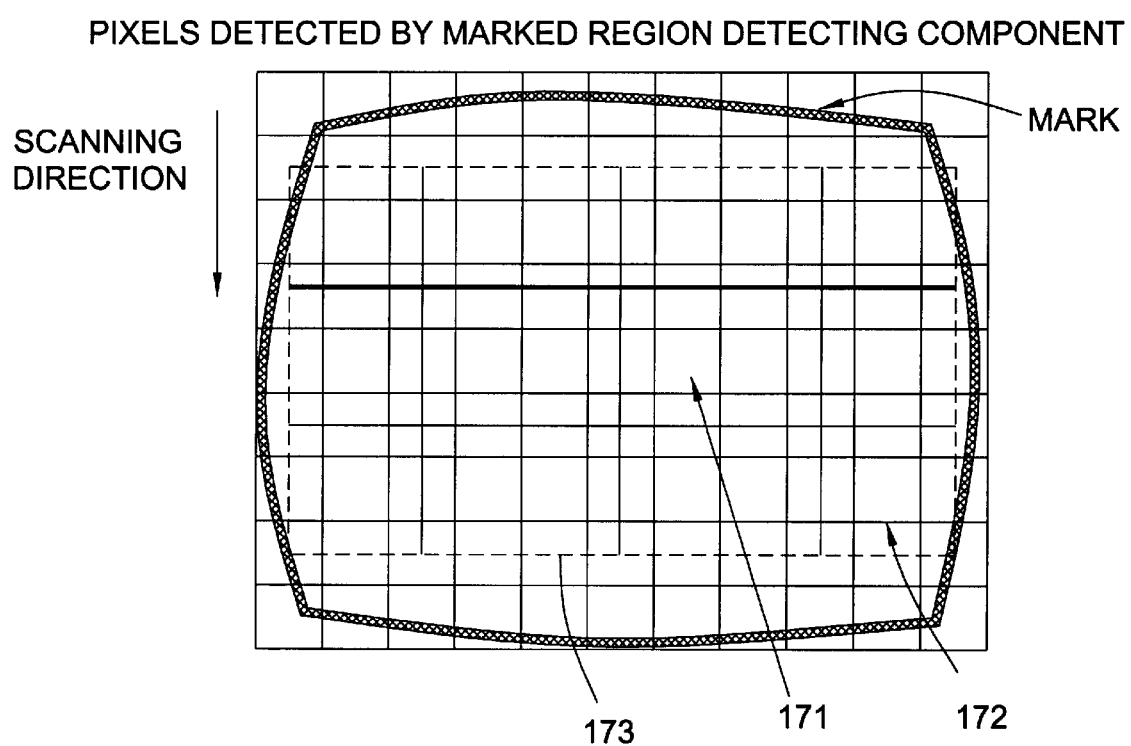
FIG. 17 illustrate detection of cell outline.

(1-2) There are cases where the outline is drawn (e.g., cell 171 in FIG. 17) and is not drawn (e.g., cell 172 in FIG. 17). In the case where the outline is not drawn, pixels forming a rectangle together with the drawn line, which are shown as a broken line 173 in FIG. 17, are regarded as a part of the element outline data set.

(1-3) Processing algorithm of this functional component is as follows. FIG. 17 supplements the explanation for each step.

Step 15-1: search for all pixel sets corresponding to the ruled lines of the table and store them. The pixel data set satisfies the following conditions simultaneously.
 1) set of pixels arranged in parallel with or orthogonal to the scanning line
 2) 320 or more successive data are all black (that is, a successive line having length of 2 cm or more in the document)

Step 15-2: If there are no pixel sets corresponding to the ruled lines enclosing the whole table in the pixel sets detected in step 15-1 (that is, as the cell 172 shown in FIG. 17, the state such that a part of the outline of the cell is not drawn), add such pixel sets (in the example of FIG. 17, four pixel sets constituting each side of the rectangle indicated by the broken line) to the pixel sets detected in step 15-1 and store them.

Step 15-3: from the pixel sets detected in step 15-2, select
 a) two sets which are in parallel with the scanning line and adjacent to each other; and
 b) two sets which are orthogonal to the scanning line and adjacent to each other,
and store the pixels constituting the sides of the rectangle formed by crossing a) and b) as one element outline data set.

Step 15-4: process in step 15-3 is executed on all combinations of pixel sets detected in step 15-2 to generate all element outline data sets and store them as a result of processing of this functional component.

(C2) Cell selection component 1609
(2-1) selecting one from the plural element outline data sets held in the cell outline detecting component 1608.
(2-2) holding the selection history, and in the case of newly selecting a set, selecting one which has not been selected yet.

(C3) Condition specifying component 1607
(3-1) having the same functions as those of the second embodiment except for the following point.
(3-2) executing the numeric value condition specification not with the percentage value, but with the real value.

(C4) In-cell string recognition component 1611
(4-1) searching an image (pixel sets) corresponding to the inside of the element outline data sets, and recognizing the strings (including numerals) in the image to store the strings.
(4-2) the target element outline data sets are stored in the cell selection component 1609.
(4-3) the recognized strings are used for determination of conditions.
(4-4) if the recognized strings do not consist of numerals (that is, do not indicate numeric values), the strings are regarded as indicating the item name and are notified to the item name-color correspondence table holding component 1612.
(4-5) the method of character recognition is the same as that of the item name detecting component in the second embodiment.

(C5) Legend image generation component 1616
(5-1) having the same functions as those of the second embodiment except for the following point.
(5-2) the character "%" is not included in the legend image.

Figure 18:
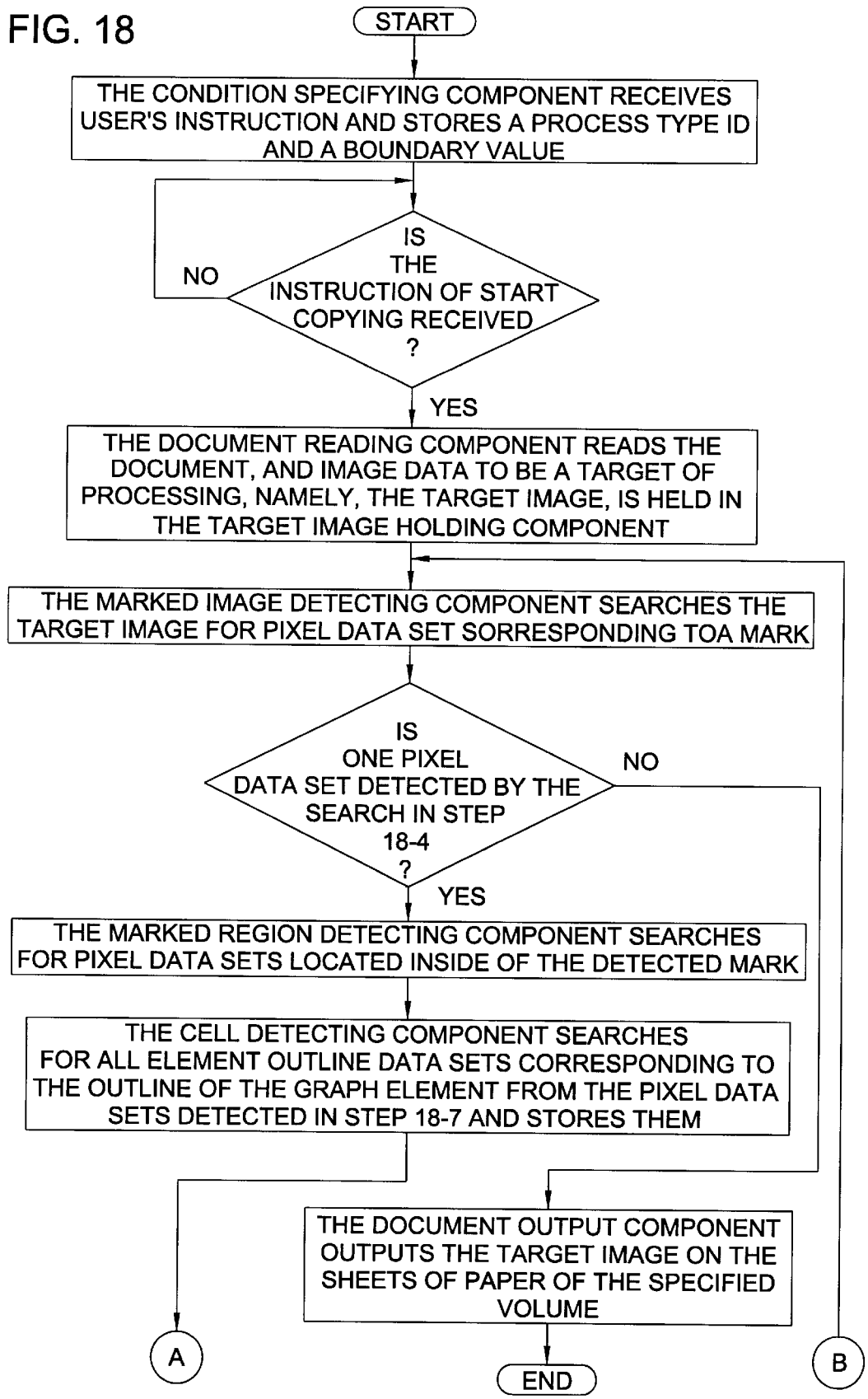
FIGS. 18–19 show a flow of overall processing of the third embodiment carried out by a process control component.
Figure 19:
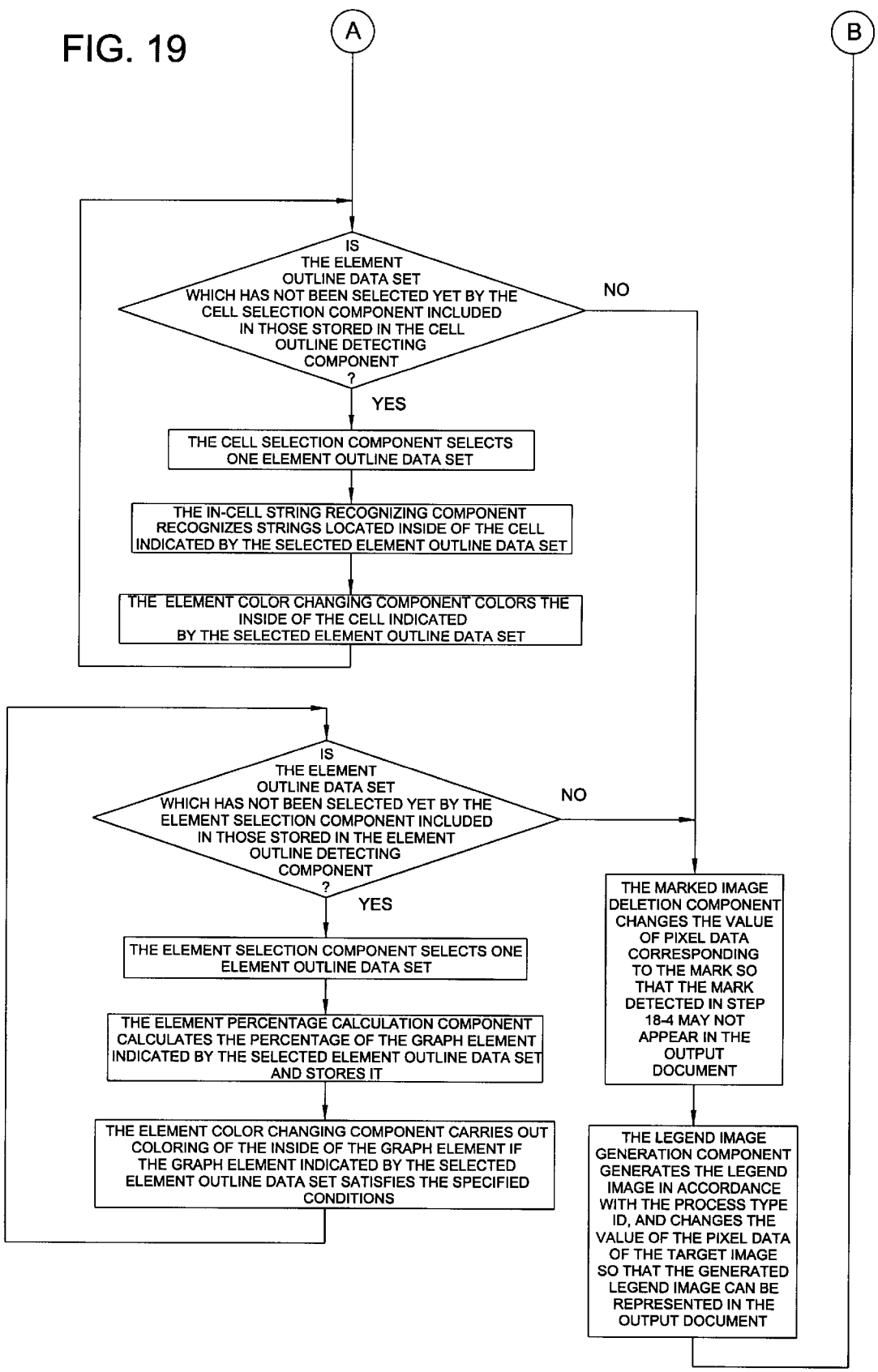

(C6) Process control component 1602
(6-1) having the same functions as those of the second embodiment except that the algorithm for processing is shown in FIGS. 18 and 19.

Steps 18-1 to 18-8: execute processing almost as same as that of the second embodiment.

Step 18-9: determine whether the element outline data set which has not been selected by the cell selection component 1609 is included in those stored in the cell outline detecting component 1608.

Step 18-10: if there is no element outline data set determined to be not selected yet in determination in step 18-9, the marked image deletion component 1615 changes the value of pixel data corresponding to the mark so that the mark detected in step 18-4 does not appear in the output document.

Step 18-11: the legend image generation component 1616 generates a legend image in accordance with the process type ID, and changes the value of the pixel data of the target image so that the legend image is represented in the output document.

Step 18-12: if there is any element outline data set determined to be not selected yet in determination in step 18-9, the cell selection component 1609 select one element outline data set.

Step 18-13: the in-cell string recognizing component 1611 recognizes strings located inside of the cell indicated by the selected element outline data set.

Step 18-14: the element color changing component 1614 colors the inside of the cell indicated by the selected element outline data set. Then the process returns to step 18-9 to repeat processing in steps 18-9 to 18-14 as long as the unprocessed element outline data sets are left.

With regard to the method of emphasis of the cell, the third embodiment can be modified as same as the second embodiment. That is, emphasis can be given to the color or form of the ruled lines of the cell, image patterns of the area inside of the cell such as hatching, or strings inside of the cell in the same way as shown in the emphasis examples of the second embodiment. It is also possible to give these emphases in accordance with value of the cell as same as the emphasis examples of the second embodiment.

Moreover, the third embodiment can be modified as follows.

EXAMPLE 1

In the third embodiment, emphasis is given to every cell unit, but in this example, it is provided to every row or column, that is, when the element color changing component carries out processing, the following conditions:
 a) the current process is task1 (distinguish by color per every item); and
 b) the cells indicated by the selected element outline sets are the leftmost or uppermost cells in the table are satisfied, not only the colors of the inside areas of the selected element outline sets, but also the colors of the inside areas of other element outline sets can be simultaneously changed. What are changed simultaneously are
 I) a cell located in the same row as those indicated by the selected element outline sets in the case they are the leftmost cells in the table in the above condition b); or
 II) a cell located in the same column as those indicated by the selected element outline sets in the case they are the uppermost cells in the table in the above condition b),
thereby every row or column of the item can be colored, and accordingly, easily distinguished.

In this emphasis, whether coloring is given per every row or column or per every cell unit may be specified by the user.

Moreover, in this emphasis, it is needless to say that emphasis methods can be realized as those of the second embodiment.

EXAMPLE 2

Figure 20A:
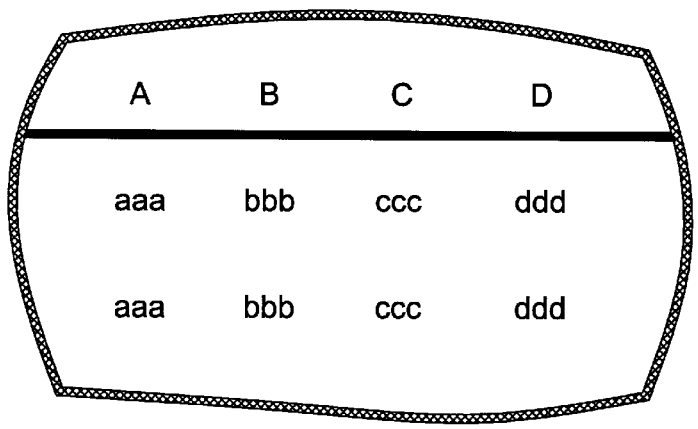
FIGS. 20(a)–20(c) illustrate interpolation of ruled lines in a table having no ruled lines.
Figure 20B:
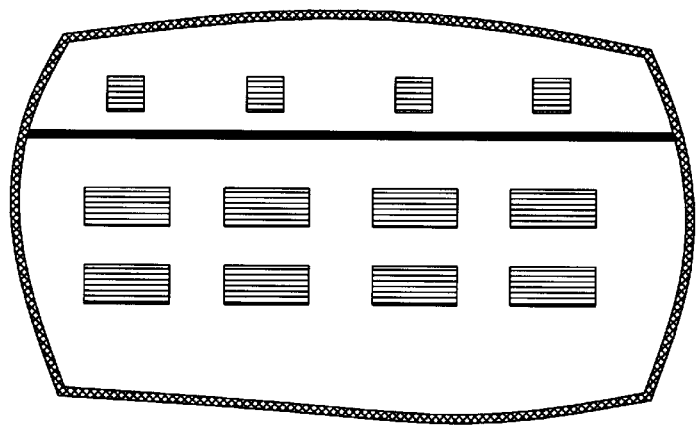
Figure 20C:
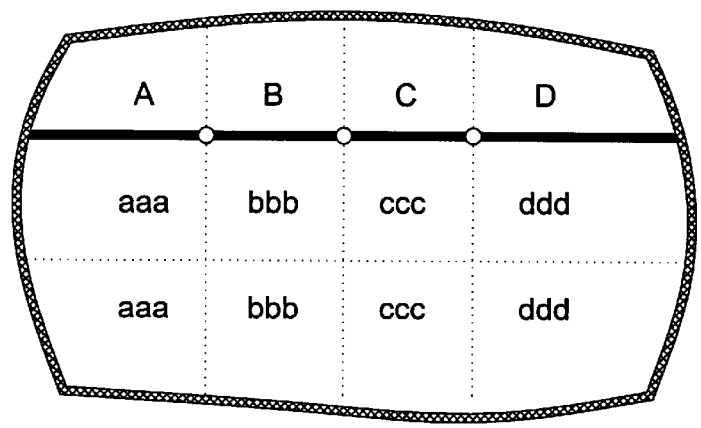

In the third embodiment, cells are basically separated by ruled lines. However, a table not divided by the ruled lines can also be processed by interpolating outlines. That is, the image areas corresponding to strings are extracted from the inside of the mark, and the outlines are interpolated between the areas, thus being processed. For example, if a table as shown in FIG. 20(*a*) is given, image areas such as shown by black rectangles in FIG. 20(*b*) are obtained and outlines which are in parallel with or orthogonal to the scanning line as shown by broken lines in FIG. 20(*c*) are interpolated therebetween. It is possible to execute as same processing as that of the third embodiment by adding the line enclosing the table as same as step 15-2 of the cell outline component of the third embodiment.

In actual processing, interpolation is carried out in the case where areas are spaced by 80 pixels or more (5 mm or more on the document) from each other taking the spaces between characters into consideration.

Figure 21A:
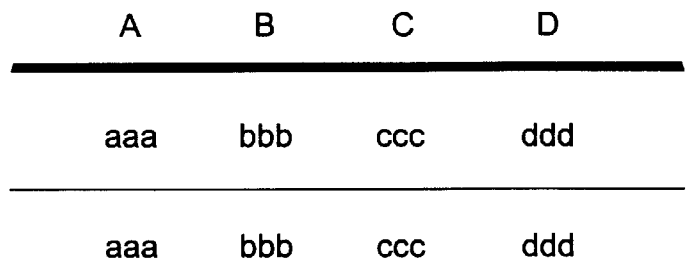
FIGS. 21(a)–21(c) show examples of tables having no ruled lines.
Figure 21B:
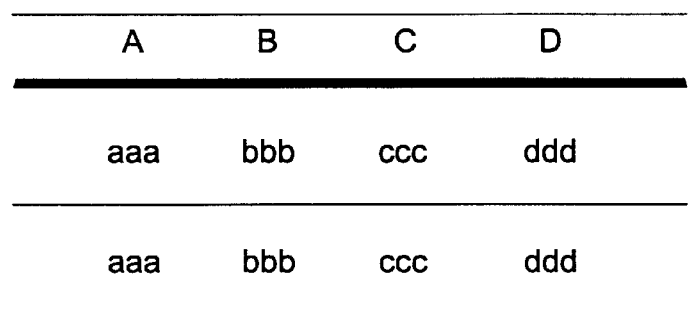
Figure 21C:
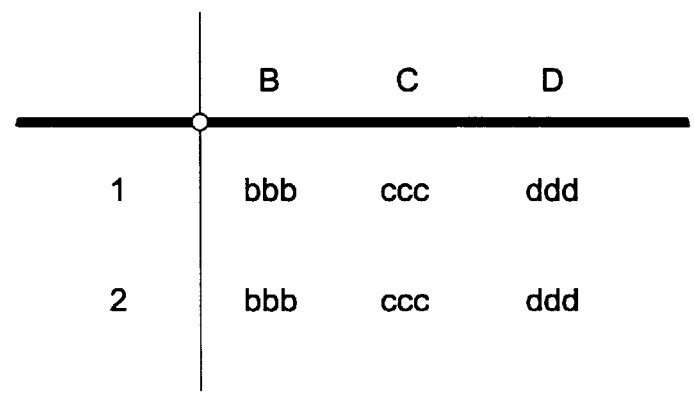

By this interpolation, a table partially lacking ruled lines such as shown in FIGS. 21(a)–(c) can be processed.

The algorithm of document processing shown in this embodiment can be implemented by a program which can be stored in a recording medium as a physical substance, for example, a floppy-disk or CD-ROM. The program stored in the recording medium is read by a computer, and controls the computer when used in it.

As clear from the above-description, according to the present invention, tables or graphs are colored in accordance with values of cells in the table, or items or values indicated by the graph elements when monochrome tables or graphs are converted into colored ones, or color schemes of the tables or graphs already colored are changed. The layout patterns of tables or graphs are also changed in accordance with values or items indicated by the table or graph elements. Consequently, emphasis according to the meaning indicated by the table or the graph can be obtained easier than before.

Moreover, according to the present invention, even if it is specified to output a monochrome document, form of lines or hatching patterns of tables or graphs can be changed in the output document in accordance with values of cells in the table or values or items indicated by the graph elements. Therefore, in comparison with the conventional arts, emphases which enable the user to easily distinguish meanings indicated by tables or graphs in the monochrome output document can be obtained without difficulty.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document processing apparatus comprising:
   information inputting means for inputting document information having a document element including a numeric value;
   element detecting means for detecting said document element including said numeric value in said document information input by said information inputting means;
   element value detecting means for detecting said numeric value included in said document element detected by said element detecting means;
   storing means for storing a numeric value condition and a method of emphasis of a document element corresponding to said numeric value condition;
   emphasis determining means for determining the method of emphasis of said document element detected by said element detecting means, if said numeric value detected by said element value detecting means satisfies said numeric value condition stored in said storing means, by fetching the method of emphasis of said document element corresponding to said satisfied numeric value condition; and
   image information generating means for generating a document image in which emphasis is given to said document element detected by said element detecting means according to said method of emphasis determined by said emphasis determining means.

2. The document processing apparatus according to claim 1, wherein said method of emphasis of said document element stored in said storing means is coloring of said document element.

3. The document processing apparatus according to claim 2, wherein a target of emphasis on said document element stored in said storing means is a character when said numeric value is visualized as a character.

4. The document processing apparatus according to claim 2, wherein a target of emphasis on said document element stored in said storing means is a background of a character when said numeric value is visualized as a character.

5. The document processing apparatus according to claim 2, wherein a target of emphasis on said document element stored in said storing means is an outline forming said document element when said document element is visualized.

6. The document processing apparatus according to claim 2, wherein a target of emphasis on said document element stored in said storing means is an inside area enclosed by an outline forming said document element when said document element is visualized.

7. The document processing apparatus according to claim 1, wherein said method of emphasis of said document element stored in said storing means is changing of form of said document element.

8. The document processing apparatus according to claim 7, wherein a target of emphasis on said document element stored in said storing means is a character when said numeric value is visualized as a character.

9. The document processing apparatus according to claim 7, wherein a target of emphasis on said document element stored in said storing means is a background of a character when said numeric value is visualized as a character.

10. The document processing apparatus according to claim 7, wherein a target of emphasis on said document element stored in said storing means is an outline forming said document element when said document element is visualized.

11. The document processing apparatus according to claim 7, wherein a target of emphasis on said document element stored in said storing means is an inside area enclosed by an outline forming said document element when said document element is visualized.

12. The document processing apparatus according to claim 1, further comprising:
    legend adding means for adding an image indicating a legend which shows the correspondence of said numeric value detected by said element value detecting means to said method of emphasis corresponding to said numeric value determined by said emphasis determining means to said document image generated by said image generating means.

13. The document processing apparatus according to claim 1, further comprising:
    specifying means for accepting a document element specified by the user from said document information input by said information inputting means; and
    said element value detecting means detecting a numeric value included in said document element accepted by said specifying means and detected by said element detecting means.

14. A document processing apparatus comprising:
    information inputting means for inputting document information having a document element including an item name indicating said document element;

element detecting means for detecting said document element including said item name indicating said document element in said document information input by said information inputting means;

item name detecting means for detecting said item name included in said document element detected by said element detecting means;

storing means for storing an item name condition and a method of emphasis of a document element corresponding to said item name condition;

emphasis determining means for determining the method of emphasis of said document element detected by said element detecting means, if said item name detected by said item name detecting means conforms to said item name condition stored in said storing means, by fetching the method of emphasis of said document element corresponding to said conformable item name; and image information generating means for generating a document image in which emphasis is given to said document element detected by said element detecting means according to said method of emphasis determined by said emphasis determining means.

15. The document processing apparatus according to claim 14, further comprising:

legend adding means for adding an image indicating a legend which shows the correspondence of said item name detected by said item name detecting means to said method of emphasis corresponding to said item name determined by said emphasis determining means to said document image generated by said image generating means.

16. The document processing apparatus according to claim 14, further comprising:

specifying means for accepting a document element specified by the user from said document information input by said information inputting means; and said item name detecting means detecting an item name included in said document element accepted by said specifying means and detected by said element detecting means.

17. A document processing apparatus comprising:

image information inputting means for inputting image information including a graph;

graph element detecting means for detecting a graph element in said image information input by said image information inputting means;

graph element value detecting means for detecting a value indicated by said graph element detected by said graph element detecting means;

emphasis determining means for determining a method of emphasis of said graph element detected by said graph element detecting means in accordance with said value indicated by said graph element detected by said graph element detecting means; and document image generating means for generating a document image in which emphasis is given to said graph element detected by said graph element detecting means in accordance with said method of emphasis determined by said emphasis determining means.

18. A document processing apparatus comprising:

image information inputting means for inputting image information including a table;

cell detecting means for detecting a cell of said table in image information input by said image information inputting means;

cell value detecting means for detecting a value indicated by said cell detected by said cell detecting means;

emphasis determining means for determining a method of emphasis of said cell detected by said cell detecting means in accordance with said value indicated by said cell detected by said cell detecting means; and document image generating means for generating a document image in which emphasis is given to said cell detected by said cell detecting means in accordance with said method of emphasis determined by said emphasis determining means.

19. A document processing method using a document processing apparatus having document inputting means for inputting a document, display means for displaying the document and storing means for storing a numeric value condition and a method of emphasis of a document element corresponding to the numeric value condition, comprising the steps of:

(a) inputting document information having a document element including a numeric value;

(b) detecting said document element including said numeric value in said document information input in step (a);

(c) detecting said numeric value included in said document element detected in step (b);

(d) determining the method of emphasis of said document element detected in step (b), if said numeric value detected in step (c) satisfies said numeric value condition stored in said storing means, by fetching the method of emphasis of said document element corresponding to said satisfied numeric value condition; and (e) generating a document image in which emphasis is given to said document element detected in step (b) according to said method of emphasis determined in step (d).

20. A document processing method using a document processing apparatus having document inputting means for inputting a document, display means for displaying the document and storing means for storing an item name condition indicating a document element and a method of emphasis of a document element corresponding to the item name condition, comprising the steps of:

(a) inputting document information having a document element including an item name indicating said document element;

(b) detecting said document element including said item name indicating said document element in said document information input in step (a);

(c) detecting said item name included in said document element detected in step (b);

(d) determining the method of emphasis of said document element detected in step (b), if said item name detected in step (c) conforms to said item name condition stored in said storing means, by fetching the method of emphasis of said document element corresponding to said conformable item name; and (e) generating a document image in which emphasis is given to said document element detected in step (b) according to said method of emphasis determined in step (d).

21. A recording medium readable by a computer having document inputting means for inputting a document, display means for displaying the document and storing means for storing a numeric value condition and a method of emphasis of a document element corresponding to the numeric value condition, said recording medium storing a program for making said computer carry out document processing, said program including instructions for executing the following processes of:

(a) inputting document information having a document element including a numeric value;

(b) detecting said document element including said numeric value in said document information input in process (a);

(c) detecting said numeric value included in said document element detected in process (b);

(d) determining the method of emphasis of said document element detected in process (b), if said numeric value detected in process (c) satisfies said numeric value condition stored in said storing means, by fetching the method of emphasis of said document element corresponding to said satisfied numeric value condition; and (e) generating a document image in which emphasis is given to said document element detected in process (b) according to said method of emphasis determined in process (d).

22. A recording medium readable by a computer having document inputting means for inputting a document, display means for displaying the document and storing means for storing an item name condition indicating a document element and a method of emphasis of the document element corresponding to the item name condition, said recording medium storing a program for making said computer carry out document processing, said program including instructions for executing the following processes of:

(a) inputting document information having a document element including an item name indicating said document element;

(b) detecting said document element including said item name indicating said document element in said document information input in process (a);

(c) detecting said item name included in said document element detected in process (b);

(d) determining the method of emphasis of said document element detected in process (b), if said item name detected in process (c) conforms to said item name condition stored in said storing means, by fetching the method of emphasis of said document element corresponding to said conformable item name; and (e) generating a document image in which emphasis is given to said document element detected in process (b) according to said method of emphasis determined in process (d).

\* \* \* \* \*